(12) United States Patent
Tahara

(10) Patent No.: US 11,774,288 B2
(45) Date of Patent: Oct. 3, 2023

(54) LIGHT INTERFERENCE GENERATOR AND INTERFERENCE IMAGING DEVICE

(71) Applicant: National Institute of Information and Communications Technology, Tokyo (JP)

(72) Inventor: Tatsuki Tahara, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 35 days.

(21) Appl. No.: 17/760,983

(22) PCT Filed: Sep. 30, 2020

(86) PCT No.: PCT/JP2020/037197
§ 371 (c)(1),
(2) Date: Mar. 16, 2022

(87) PCT Pub. No.: WO2021/070708
PCT Pub. Date: Apr. 15, 2021

(65) Prior Publication Data
US 2022/0349755 A1    Nov. 3, 2022

(30) Foreign Application Priority Data
Oct. 7, 2019 (JP) .................. 2019-184599

(51) Int. Cl.
*G01J 3/45* (2006.01)
*G01J 3/433* (2006.01)
(52) U.S. Cl.
CPC .................. *G01J 3/45* (2013.01); *G01J 3/433* (2013.01)

(58) Field of Classification Search
CPC ............ G01B 9/02057; G01B 9/02097; G01B 9/02098; G01J 3/45; G01J 3/4531;
(Continued)

(56) References Cited

U.S. PATENT DOCUMENTS 6,937,347 B2 * 8/2005 Erwin .................. G01J 9/0215
356/520
11,248,901 B2 * 2/2022 Goodwin ............. G01N 21/453
(Continued)

FOREIGN PATENT DOCUMENTS

JP      2017076038 A    4/2017
JP      6308594 B2      4/2018
(Continued)

OTHER PUBLICATIONS

Samsheerali, P.T. et al. "Quantitative phase contrast imaging using common-path in-line digital holography". Optics Communications, 285, 2012, pp. 1062-1065. (Year: 2012).*
(Continued)

*Primary Examiner* — Michael A Lyons
(74) *Attorney, Agent, or Firm* — GRUMBLES LAW PLLC; Brittany Haanan

(57) ABSTRACT

An interference imaging device includes a light interference generator that includes: a light wave splitter configured to reflect a part of incident light and to allow a remaining part of the incident light to pass through; a phase modulator configured to modulate a phase of incident light that has passed through the light wave splitter; and a reflector configured to reflect the phase-modulated incident light from the phase modulator so that the reflected, phase-modulated incident light overlaps with incident light that has been reflected by the light wave splitter.

17 Claims, 22 Drawing Sheets

(58) Field of Classification Search
CPC .... G01J 3/4532; G01J 2003/451; G01J 3/433; G03H 2001/0224; G03H 2223/24; G03H 2225/32
See application file for complete search history.

(56) References Cited

U.S. PATENT DOCUMENTS

| | | | |
|---|---|---|---|
| 2011/0216324 A1* | 9/2011 | Arieli | G02F 1/13336 356/453 |
| 2018/0173160 A1* | 6/2018 | Rosen | G01B 9/02047 |
| 2019/0250558 A1* | 8/2019 | Javidi | G01N 21/453 |
| 2021/0149341 A1* | 5/2021 | Bledowski | G03H 1/2205 |
| 2021/0164894 A1* | 6/2021 | Prater | G01N 21/35 |

FOREIGN PATENT DOCUMENTS

| | | | | |
|---|---|---|---|---|
| WO | WO-2016173079 A1 * | 11/2016 | | G01J 9/02 |
| WO | 2018147473 A1 | 8/2018 | | |
| WO | 2019010507 A1 | 1/2019 | | |

OTHER PUBLICATIONS

Hao, Bengong et al. "Radius measurement using two-windows common-path interferometry with phase grating". Proc. SPIE 8759, Eighth International Symposium on Precision Engineering Measurement and Instrumentation, 87591X, Jan. 31, 2013. (Year: 2013).*
International Search Report and Written Opinion pertaining to PCT/JP2020/037197, dated Dec. 22, 2020.

* cited by examiner

LIGHT INTERFERENCE GENERATOR AND INTERFERENCE IMAGING DEVICE

CROSS-REFERENCE TO RELATED APPLICATIONS

The present application is a U.S. National Stage, under 35 U.S.C. § 371, of International Application Number PCT/JP2020/037197, filed Sep. 30, 2020, the disclosure of which is hereby incorporated by reference herein in its entirety.

TECHNICAL FIELD

The disclosure relates to a light interference generator that generates interference light from incident light and an interference imaging device that generates a complex amplitude image from the interference light.

BACKGROUND ART

Information on wavelength characteristics of light has been utilized in a variety of ways including usage as a vital sign concerning a health condition of an organism, as information on a type or property of a substance or material, as a feature quantity that is beneficial for object recognition or identification with an eye or robot vision. As a method of obtaining wavelength information on color, the time division technique in which RGB (red, green, blue) color filters are used in front of an image sensor has been proposed. Another method that has been proposed is the space-division-multiplexing technique in which light is split into red, green, and blue using a diffraction grid or prism and then an image is captured separately for the three colors using three image sensors. A recent addition to a proposed method of obtaining wavelength information is a method using an image sensor equipped with a Bayer-type color filter array. With the Bayer-type color filter array, however, because wavelength information is split by spectral absorption of individual filters, it is difficult to obtain clear wavelength information when the amount of available light is limited.

Because of this, a multi-wavelength sensing method that uses phase modulation instead of light absorption and includes spectral signal processing based on computational coherent superposition has been proposed (Patent Literature 1). With this method described in Patent Literature 1 (hereinafter "Prior Art 1"), phase modulation that is different for each wavelength is provided as a temporal or spatial pattern, and a wavelength multiplexed image is obtained using a monochrome image sensor. As shown in FIG. 29, Prior Art 1 includes a light source 90 that emits light of different wavelengths and has a phase modulation element 94 that is arranged in the optical path of reference light in a two-beam interferometer 9. Prior Art 1 uses a monochrome image sensor 98 to obtain a phase modulation image. Examples of the phase modulation element 94 include a mirror with a piezoelectric element, a spatial optical modulator, a wave plate, and a wave plate array. According to Prior Art 1, when there are N number of wavelengths, image information of each wavelength can be obtained from 2N number of images. A phase modulation pattern is not necessarily regular, and of the 2N number of images, it is sufficient for at least one image to have a different phase modulation amount from other images. Because Prior Art 1 separates and extracts wavelength information through signal processing by a calculation unit 99 instead of using spectral absorption, high utilization efficiency of light is realized.

A method for performing spectral signal processing at a chosen phase modulation amount has also been proposed (Patent Literature 2). This is in contrast to Prior Art 1 in which the amount of phase modulation is an integer multiple of $2\pi$. With the method described in Patent Literature 2 (hereinafter "Prior Art 2"), an electro-optic element that uses an electro-optic effect can be used as a phase modulation element in addition to the examples described above. This electro-optic element is arranged either along an optical path of one side of a two-beam interferometer or along an optical path through which both light waves travel.

CITATION LIST

Patent Literature

Patent Literature 1: Japanese Patent Number 6308594
Patent Literature 2: Japanese Unexamined Patent Application Publication No. 2017-076038

In the prior arts described above, because a device configured from a two-beam interferometer is adopted, optical paths for object light and reference light are required, resulting in the device becoming large and complex. In the example of FIG. 29, the two-beam interferometer 9 needs the following optical components to form optical paths of object light and reference light, making the device large and complex: a mirror 91, a 50% beam splitter 92, beam splitters 93, 97, an objective lens 95, and a convex lens 96. As a result, with the above-described prior arts, when individual optical paths are affected by different disturbances (for example, vibrations), the phase of interference light (light that is obtained from interfering light waves) changes, and this can cause measurement accuracy to drop significantly.

SUMMARY

In view of the aforementioned problem, a light interference generator according to an embodiment of the disclosure is configured in the following way. A light interference generator of a common-path type that generates interference light, which is light obtained from interfering light waves, from incident light. The light interference generator includes: a light wave splitter configured to reflect a part of the incident light and allow a remaining part of the incident light to pass through the light wave splitter; a phase modulator configured to modulate the phase of incident light that has passed through the light wave splitter; and a reflector configured to reflect the phase-modulated incident light from the phase modulator so that the reflected, phase-modulated incident light overlaps with incident light that has been reflected by the light wave splitter.

In view of the aforementioned problem, an interference imaging device according to an embodiment of the disclosure is configured in the following way. An interference imaging device includes: a light interference generator that is a common-path type and is configured to generate interference light, which is light obtained from interfering light waves, from incident light; an interference light detector configured to detect the interference light generated by the light interference generator; and a calculation unit configured to generate a complex amplitude image from the detected interference light. The light interference generator includes: a light wave splitter configured to split the incident light into two light waves; a phase modulator configured to allow to pass therethrough or modulate the phase of first split light of the incident light that has been split by the light wave splitter and to allow to pass therethrough or modulate the phase of second split light of the incident light that has been split by the light wave splitter; and a light wave coupler configured to combine the first split light and the second split light that are transmitted from the phase modulator to form the interference light. The calculation unit is configured to make, with a predetermined phase modulation pattern, the phase modulator perform phase modulation that is dependent on a wavelength and to generate the complex amplitude image from the interference light with computational coherent superposition or a Fourier spectroscopy algorithm.

In view of the aforementioned problem, an interference imaging device according to an embodiment of the disclosure is configured in the following way. An interference imaging device includes: a light interference generator that is a common-path type and is configured to generate interference light, which is light obtained from interfering light waves, from incident light; an interference light detector configured to detect the interference light generated by the light interference generator; and a calculation unit configured to generate a complex amplitude image from the detected interference light. The light interference generator includes: a light wave splitter configured to split the incident light into two light waves; and a phase modulator configured to modulate the phase of first split light of the incident light that has been split by the light wave splitter, overlap the first split light with second split light of the incident light that has been split by the light wave splitter to form the interference light, and output the interference light. The calculation unit is configured to make, with a predetermined phase modulation pattern, the phase modulator perform phase modulation that is dependent on a wavelength and to generate the complex amplitude image from the interference light with computational coherent superposition or a Fourier spectroscopy algorithm.

DESCRIPTION OF EMBODIMENTS

Embodiments and modifications of the disclosure will be described in detail with reference to drawings as appropriate. The same means are given the same reference numbers and repeat descriptions will be omitted.

First Embodiment: Reflector Type

<Interference Imaging Device>

An interference imaging device 1 according to a first embodiment will be described with reference to FIG. 1.

Figure 1:
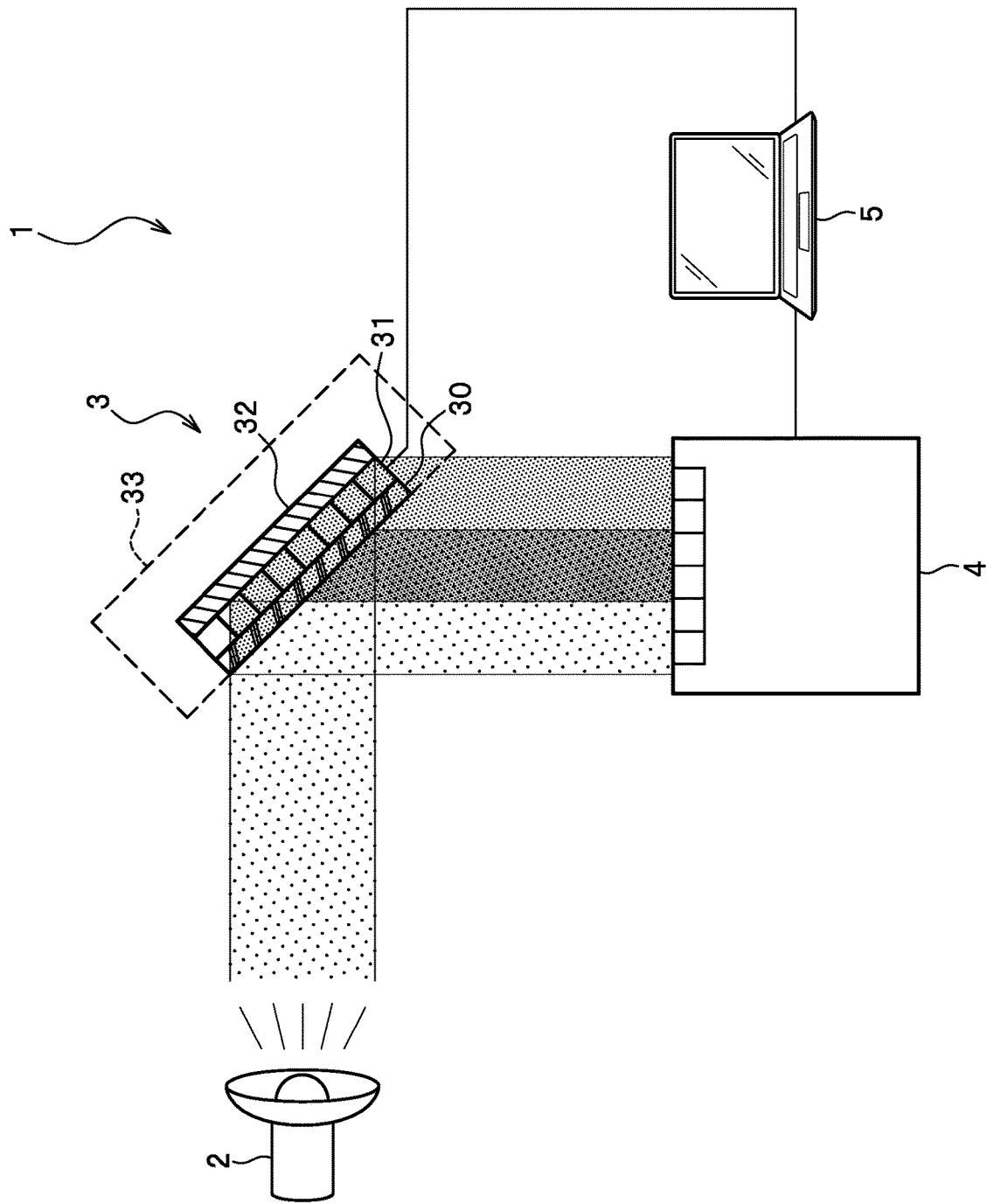
FIG. 1 is a schematic block diagram of an interference imaging device in accordance with a first embodiment.

As show in FIG. 1, the interference imaging device 1 is a common-path type interferometer that generates a complex amplitude image The interference imaging device 1 includes a light source 2, a light interference generator 3, an image sensor (an interference light detector) 4, and a calculation unit 5. The interference imaging device 1 according to present embodiment is a reflector type.

The light source 2 is configured to emit light to the light interference generator 3. The light emitted by the light source 2 becomes incident light that illuminates the light interference generator 3. Examples of the light source 2 include a light source (such as general lighting equipment or sunlight) that emits incoherent light. Examples of the light source 2 also include a laser light source that emits coherent laser light. Light emitted by the light source 2 may include either a single wavelength or multiple wavelengths. An object whose image is to be obtained through interference imaging may be arranged between the light source 2 and the light interference generator 3 or between the light interference generator 3 and the image sensor 4.

The light interference generator 3 is configured to generate interference light (light obtained from interfering light waves) from incident light emitted from the light source 2. The interference light generated by the light interference generator 3 illuminates strikes the image sensor 4. In other words, the light interference generator 3 is a common-path type optical device with a common optical path and is also a reflector type optical device that reflects incident light. As shown in FIG. 1, the light interference generator 3 is arranged on an optical axis of the light source 2 (on the right side of the drawing). The light interference generator 3 is arranged at an angle with respect to the light source 2 and the image sensor 4 so that the light interference generator 3 can reflect the incident light from the light source 2 to the image sensor 4. Details of the light interference generator 3 will be described later.

The image sensor 4 is configured to detect interference light (light obtained from interfering light waves) generated by the light interference generator 3. The image sensor 4 obtains information (an interference fringe image) on the interference light from the light interference generator 3, and outputs the obtained information on the interference light to the calculation unit 5. Examples of the image sensor 4 include a general photodetector such as a charge-coupled device (CCD) or a complementary metal-oxide-semiconductor (CMOS). As shown in FIG. 1, the image sensor 4 is arranged below the light interference generator 3 so that interference light from the light interference generator 3 falls on the image sensor 4.

The calculation unit 5 is configured to enable the phase modulator 31 to perform phase modulation that is wavelength dependent on a wavelength with a predetermined phase modulation pattern. Furthermore, the calculation unit 5 is configured to generate, using computational coherent superposition or a Fourier spectroscopy algorithm, a complex amplitude image from the interference light detected by the image sensor 4. The calculation unit 5 is a general-purpose computer for performing the above-mentioned calculation. The calculation unit 5 is connected to the light interference generator 3 and image sensor 4 via a signal cable. Details of the calculation unit 5 will be described later.

<Light Interference Generator>

The light interference generator 3 will be described in detail with reference to FIG. 2.

Figure 2:
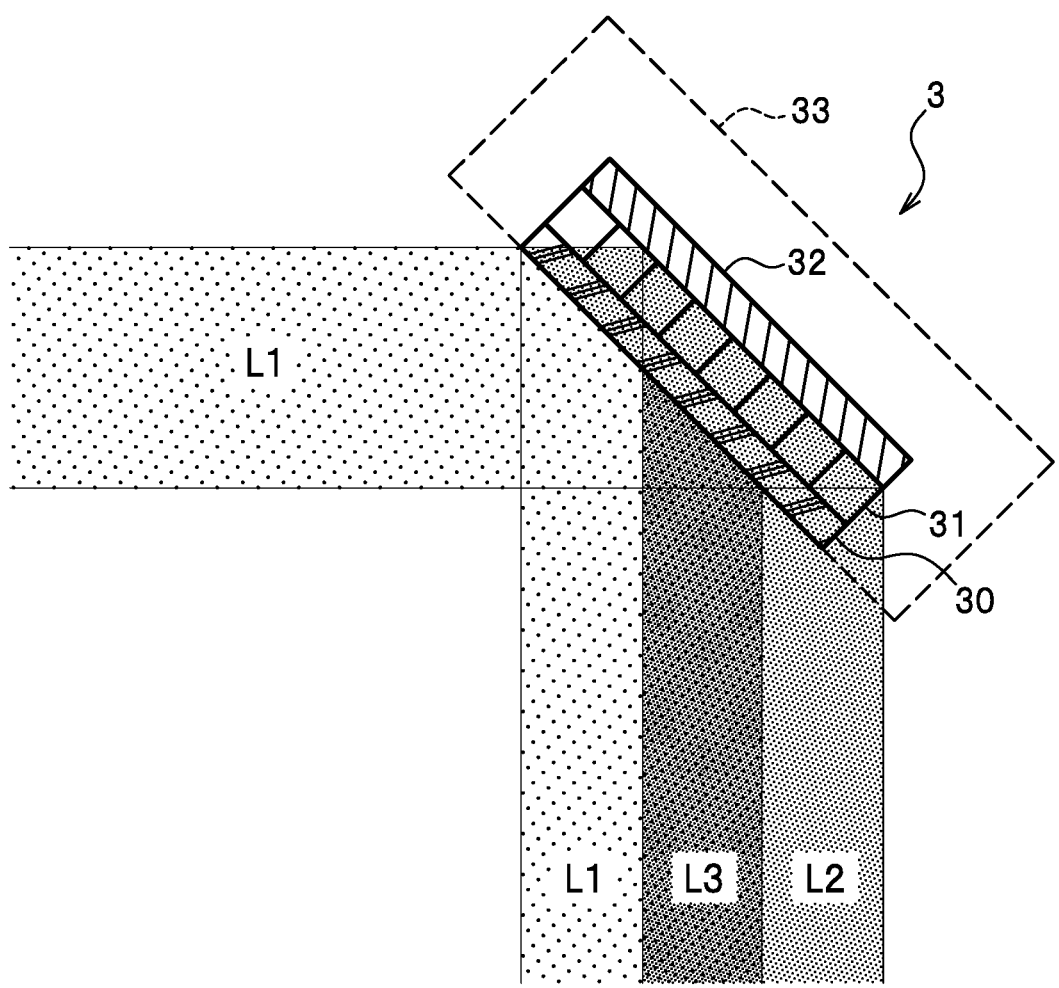
FIG. 2 is a schematic block diagram of a light interference generator shown in FIG. 1.

As shown in FIG. 2, the light interference generator 3 includes a light wave splitter 30, a phase modulator 31, a reflector 32, and a housing 33.

In FIG. 2, light L1 that is emitted by the light source 2 and reflected by the light wave splitter 30 is shown by a lightly dotted region. Light L2 whose phase is modulated by the phase modulator 31 and reflected by the reflector 32 is shown by dots of medium density. Light L3 that is a combination of these two lights is shown by a thickly dotted region.

The light wave splitter 30 is configured to reflect a part (light L1) of the incident light emitted by the light source 2 and transmit the remaining incident light (light L2). The light wave splitter 30 reflects a part of the incident light and allows the remaining incident light that is not reflected to pass through to the phase modulator 31. The light wave splitter 30 may for example be a mirror structure with a predetermined reflectance and transmissivity (such as a 50% beam splitter), a diffraction grating, or a bifocal lens. The ratio of incident light that is reflected to incident light that is transmitted may be any value for the light wave splitter 30 and is not limited like the 50% beam splitter to a 1:1 ratio.

The phase modulator 31 is configured to perform phase modulation of light L2, incident light that has passed through the light wave splitter 30. The phase modulator 31 is arranged so that it is adjacent to the light wave splitter 30. According to the present embodiment, the phase modulator 31 is given as input from the calculation unit 5 a phase modulation pattern that is temporally or spatially different for each wavelength. Based on this phase modulation pattern, the phase modulator 31 modulates the phase of incident light. The phase modulator 31 may for example be a liquid lens, an acousto-optic modulator (AOM), a variable pathlength cell, a liquid crystal device, a liquid crystal array, an electrooptical device, an electro-optic modulator (EOM), a birefringent material such as a waveplate, an array of birefringent materials, or a spatial light modulator (SLM) such as a reflective type SLM (a liquid crystal on Silicon SLM [LCOS-SLM]). A method of controlling a refractive index of a liquid or a birefringent material with heat may be used by the phase modulator 31.

The reflector 32 is configured to reflect light L2 (incident light that has been modulated by the phase modulator 31) so that it overlaps with light L1 (incident light that has been reflected by the light wave splitter 30). The reflector 32 is arranged so that it is adjacent to the phase modulator 31. In other words, a part of the incident light from the light source 2 is reflected by the light wave splitter 30 and the remaining incident light passes through the phase modulator 31; the reflector 32 reflects said remaining incident light so that an optical path of said remaining incident light overlaps with an optical path of said part of the incident light. The reflector 32 may for example be a general mirror (including a parallel plate shaped mirror). In one or more embodiments, the reflector 32 is a reflective layer including a coating of a reflective material (such as an aluminum coating).

The housing 33 is configured to house the light wave splitter 30, phase modulator 31, and reflector 32 (outline of the housing is shown by a broken line). The housing 33 may for example be a box-shaped case made of metal. The housing 33 includes an opening (not shown) that exposes an incident light receiving face of the light wave splitter 30 so that incident light can reach the incident light receiving face of the light wave splitter 30. Within the housing 33, the light wave splitter 30, phase modulator 31, and reflector 32 are adjacent to each other but may be spaced apart.

With the configuration as described above, the light interference generator 3 is able to generate interference light (light L3). As shown in FIG. 2, incident light from the light source 2 is split by the light wave splitter 30 into light L2, which passes through the light wave splitter 30 and reaches the phase modulator 31, and light L1, which does not reach the phase modulator 31 but is reflected by the light wave splitter 30. The light L2 that passes through the light wave splitter 30 is modulated by the phase modulator 31. The light L2 that has been modulated by the phase modulator 31 is then reflected by the reflector 32. In a portion where light L1, which has been reflected by the light wave splitter 30, overlaps with light L2, which has been modulated by the phase modulator 31, interference between the two lights L1 and L2 occurs to form interference light, light L3. This interference light falls on the image sensor 4.

<Arithmetic Processing by Calculation Unit>

As will be described below, the calculation unit 5 uses computational coherent superposition (CCS) such as a phase shift method, which can selectively extract wavelength information, or a phase shifting interferometry. Let the number of wavelengths be N, a matrix of interference light intensity of an interference fringe image be $I_n$, a matrix of an amount of phase modulation of incident light of N wavelengths be P, and a matrix of complex amplitude distribution of incident light of N wavelengths be U. Furthermore, let a be an amount of phase modulation and let I(x, y: $\alpha_{1m}, \ldots, \alpha_{Nm}$) represent a wavelength multiplexed interference fringe image with phase shift amounts $\alpha_{1m}, \ldots, \alpha_{Nm}$ for wavelengths $\lambda_1, \ldots, \lambda_N$ respectively. Furthermore, let $I_{0th}$ be the sum of intensity of 0th order diffracted light; $A_{oi}$ be an amplitude of object light at wavelength $\lambda_i$; $A_{ri}$ be an amplitude of reference light at wavelength $\lambda_i$; $\varphi_{oi}$ be a phase of object light at wavelength $\lambda_i$ (i, m are subscripts). When (2N+1) number of interference fringe images are inputted, equation 1 below can be defined from the relationship $I_n$=PU.

[Equation 1]

$$\begin{pmatrix} I(x, y: 0, \ldots, 0) \\ I(x, y: \alpha_{11}, \ldots, \alpha_{N1}) \\ I(x, y: \alpha_{12}, \ldots, \alpha_{N2}) \\ \vdots \\ I(x, y: \alpha_{12N}, \ldots, \alpha_{N2N}) \end{pmatrix} = \tag{1}$$

$$\begin{pmatrix} 1 & 1 & 0 & \cdots & 1 & 0 \\ 1 & \cos\alpha_{11} & \sin\alpha_{11} & \cdots & \cos\alpha_{N1} & \sin\alpha_{N1} \\ 1 & \cos\alpha_{12} & \sin\alpha_{12} & \cdots & \cos\alpha_{N2} & \sin\alpha_{N2} \\ \vdots & \vdots & \vdots & \cdots & \vdots & \vdots \\ 1 & \cos\alpha_{12N} & \sin\alpha_{12N} & \cdots & \cos\alpha_{N2N} & \sin\alpha_{N2N} \end{pmatrix} \cdot$$

$$\begin{pmatrix} I_{0th}(x, y) \\ 2A_{o1}(x, y)A_{y1}(x, y)\cos\phi_{o1}(x, y) \\ 2A_{o1}(x, y)A_{y1}(x, y)\sin\phi_{o1}(x, y) \\ \vdots \\ 2A_{oN}(x, y)A_{yN}(x, y)\sin\phi_{oN}(x, y) \end{pmatrix}$$

The desired light information, a matrix U of complex amplitude distribution of incident light of N wavelengths, can be obtained by U=P−1 I n. When obtaining the matrix U of complex amplitude distribution, the matrix P of phase modulation amounts corresponding to N wavelengths becomes important. For example, by setting the matrix P of phase modulation amounts so that a condition number is reduced in accordance with light interference generator 3, accuracy of calculation is improved. Further description is omitted as an example of computational coherent superposition is described in detail in Patent Literatures 1 and 2.

The calculation unit 5 may use a general Fourier spectroscopy algorithm. For example, the calculation unit 5 may use a Fourier spectroscopy algorithm based on temporal heterodyne or spatial heterodyne.

The calculation unit 5 performs arithmetic processing on an interference fringe image to generate a complex amplitude image that corresponds to a diffraction image of an object. The calculation unit 5 performs arithmetic processing of light wave propagation such as diffraction integral for integration on the complex amplitude image so that an in-focus image at an arbitrary depth of choice is obtained. In this way, the interference imaging device 1 is able to perform a lensless three-dimensional (3D) image sensing.

<Effects>

Figure 29:
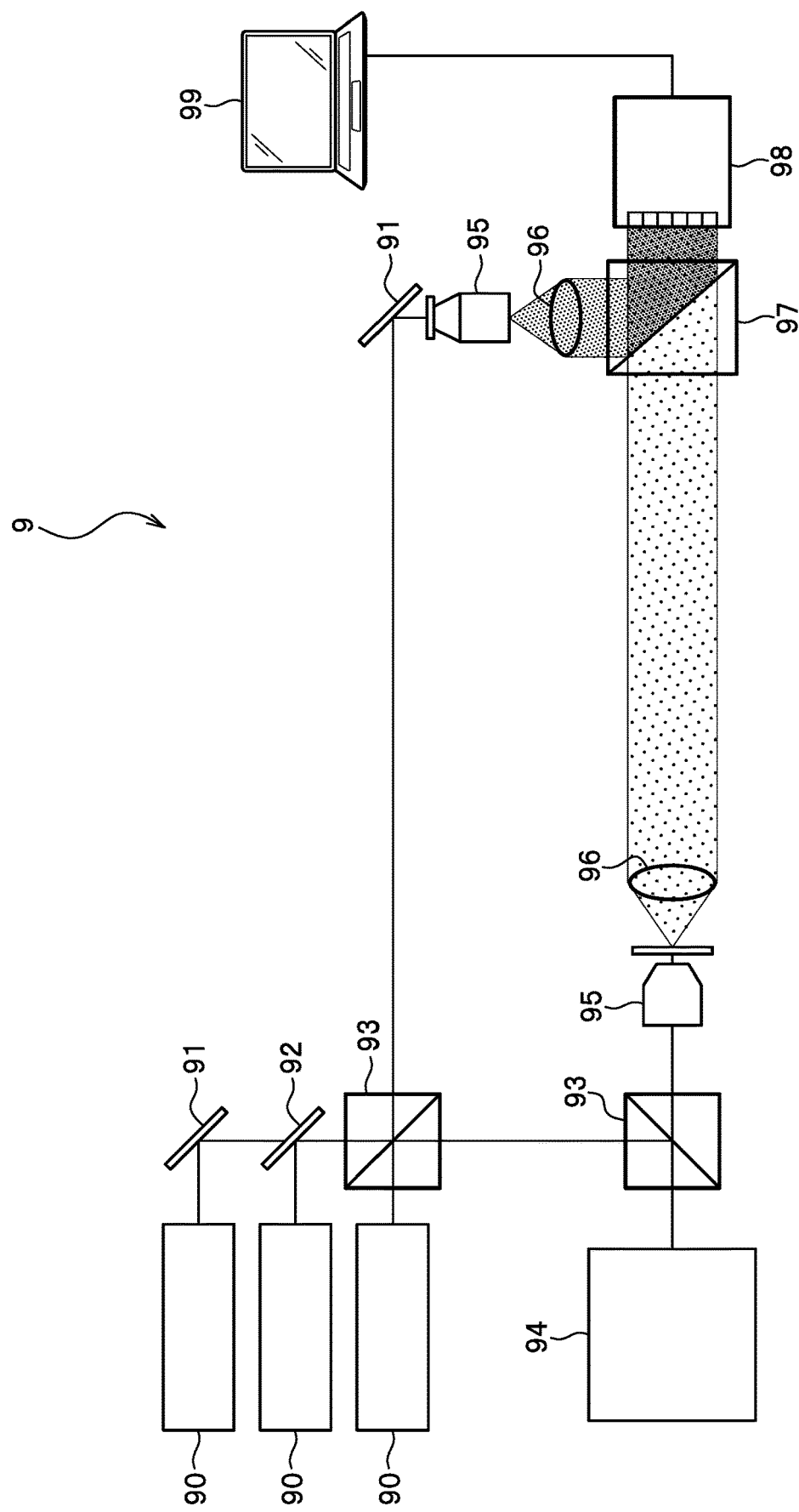
FIG. 29 is a schematic block diagram of a conventional two-beam interferometer.

As described above, the interference imaging device 1 does not need to form separate optical paths for object light and reference light like the two-beam interferometer 9 (FIG. 29). Therefore, configuration can be simplified for the interference imaging device 1.

Furthermore, because an imaging lens is unnecessary, the interference imaging device 1 can be miniaturized. Furthermore, because, the interference imaging device 1 can use light source 2 that emits incoherent light (for example, general lighting equipment or sunlight), versatility is improved.

Furthermore, because the interference imaging device 1 uses a phase modulator 31 that operates at high speed, real-time performance is enhanced.

Furthermore, because a mechanical drive is not needed, the interference imaging device 1 is robust against vibrations compared to a two-beam interferometer 9 and can be moved around easily. With the interference imaging device 1, reliability and convenience is therefore improved.

First Modification: Wedge-Shaped Reflector

Figure 3A:
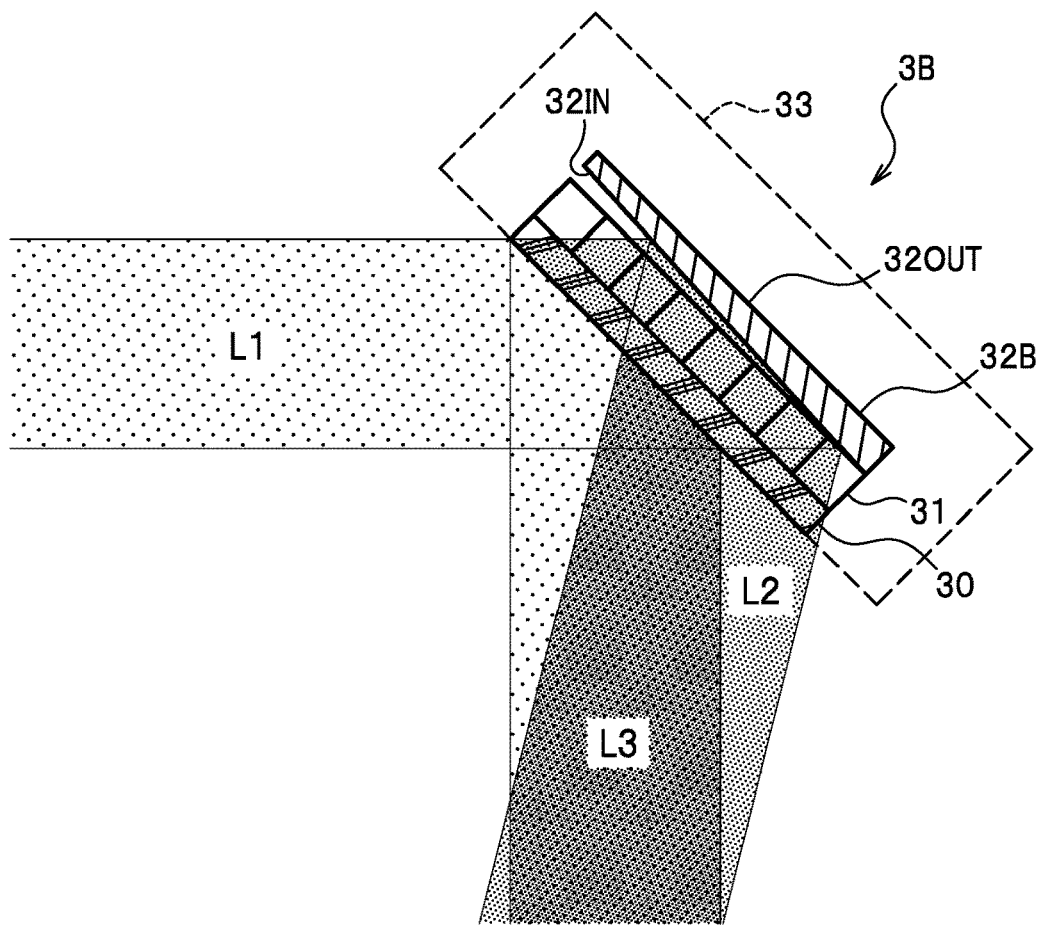
FIG. 3A and FIG. 3B are schematic block diagrams of a light interference generator in accordance with a first modification.

A light interference generator 3B according to a first modification will be described on a point that differs from the first embodiment. As shown in FIG. 3A, the light interference generator 3B differs from the first embodiment in that the reflector 32B is wedge shaped.

Configurations other than the configuration of the reflector 32B are the same as those of the first embodiment and will therefore not be described. To make the illustration easier to see, incident light has been omitted from FIG. 3B.

The reflector 32B is configured so that a flat face on the side on which incident light illuminates strikes, in other words, a reflecting face 32IN that reflects incident light, is wedge-shaped. By wedge-shaped, it means that the face is inclined from one end to the other end. Therefore, the reflector 32B has one end (the end on the lower side thereof in the drawing) that has greater thickness than the other end (the end on the upper side thereof in the drawing), making a gap between the reflecting face 32IN and the phase modulator 31 to become greater at the other end. A flat face 32OUT is on the back side of the reflector 32B, as opposed to the reflecting face 32IN that is on the front side of the reflector 32B. The flat face 32OUT of the reflector 32B is parallel with the phase modulator 31. The inclined face that forms the wedge shape may be flat. In one or more embodiments, the inclined face that forms the wedge shape is not flat.

Figure 3B:
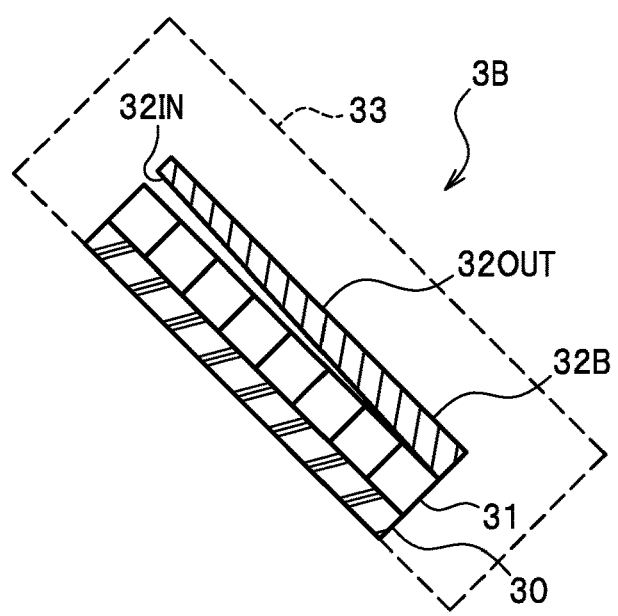

With the light interference generator 3B, because the reflector 32B is wedge shaped as shown in FIG. 3B, the direction of propagation of a light wave that has been phase modulated by the phase modulator 31 can be altered. As a result, as shown in FIG. 3A, the light interference generator 3B increases the region in which light wave interference occurs, making differential interference possible and making interference light easier to generate.

Second Modification: Wedge-Shaped Light Wave Splitter

Figure 4:
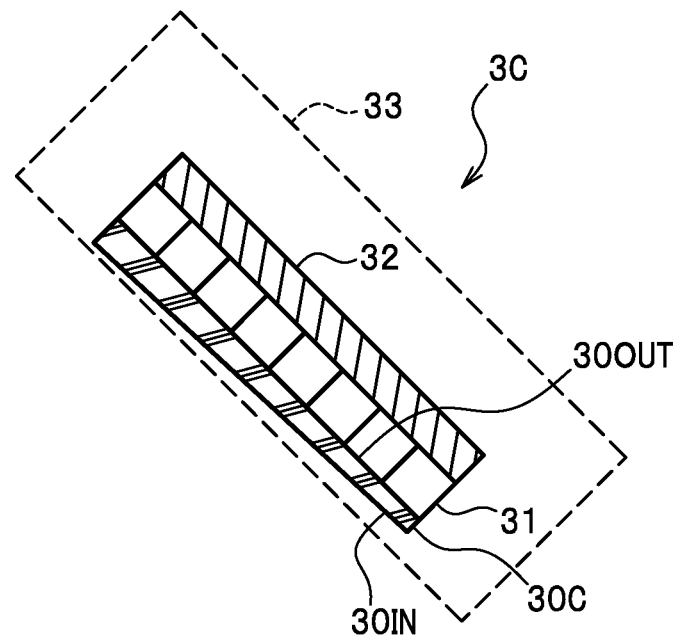
FIG. 4 is a schematic block diagram of a light interference generator in accordance with a second modification.

A light interference generator 3C according to a second modification will be described on a point that differs from the first embodiment. As shown in FIG. 4, the light interference generator 3C differs from the first embodiment in that the light wave splitter 30C is wedge shaped.

Configurations other than the configuration of the light wave splitter 30C are the same as those of the first embodiment and will therefore not be described.

The light wave splitter 30C is configured so that an incident light receiving face 30IN that incident light illuminates is wedge-shaped. Therefore, the light wave splitter 30C has one end (the end on the lower side in the drawing) that is thinner than the other end (the end on the upper side in the drawing). A flat face that is on the back side of the light wave splitter 30C, as opposed to the incident light receiving face 30IN that is on the front side of the light wave splitter 30C, is referred to as an incident light exiting face 30OUT from which transmitted incident light leaves the light wave splitter 30C. The incident light exiting face 30OUT is parallel with the phase modulator 31.

The light wave splitter 30C may be configured so that, instead of the incident light receiving face 30IN, the incident light exiting face 30OUT is wedge-shaped (not shown). In this case, a gap is formed between the light wave splitter 30C and the phase modulator 31, and the light wave splitter 30C is configured to prevent stray light from being emitted from this boundary.

In this way, because the light wave splitter 30C is wedge shaped, the light interference generator 3C can alter the direction of propagation of a light wave and thus achieves the same effect as the first modification.

Third Modification: Phase Modulator with Non-Uniform Thickness

Figure 5:
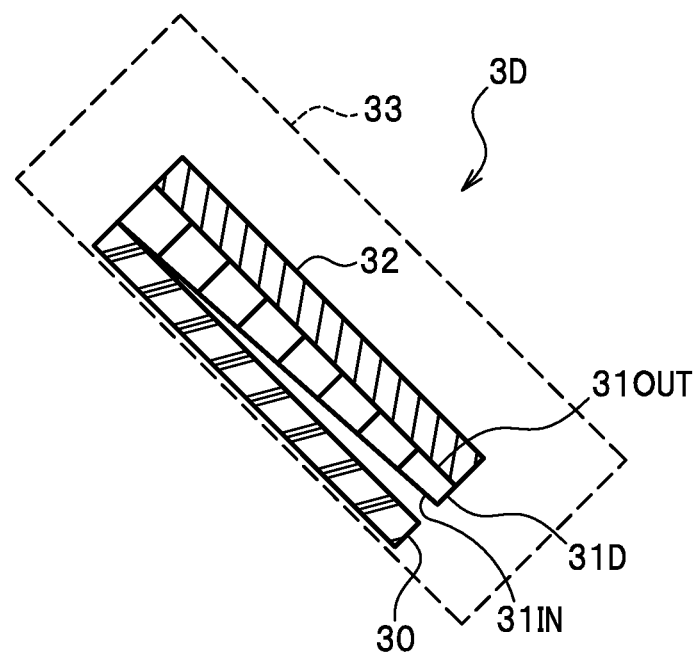
FIG. 5 is a schematic block diagram of a light interference generator in accordance with a third modification.

A light interference generator 3D according to a third modification will be described on a point that differs from the first embodiment. As shown in FIG. 5, the light interference generator 3D differs from the first embodiment in that the phase modulator 31D has non-uniform thickness.

Configurations other than the configuration of the phase shift modulator 31D are the same as those of the first embodiment and will therefore not be described.

The phase modulator 31D is configured so that its thickness changes from one end to the other with one end (the end on the lower side in the drawing) being thinner than the other end (the end on the upper side in the drawing). In other words, the thickness of the phase modulator 31D is not uniform. Since the side with an incident light receiving face 31IN on which incident light illuminates is inclined to reduce the thickness, a gap formed between the incident light receiving face 31IN and light wave splitter 30 widens at said one end. A flat face on the back side of the phase modulator 31D, as opposed to the incident light receiving face 31IN that is on the front side of the phase modulator 31D, is referred to as an incident light exiting face 31OUT from which transmitted incident light leaves the phase modulator 31D. The phase modulator 31D may be configured so that, instead of using the side with the incident light receiving face 31IN, the side with the incident light exiting face 31OUT is used to reduce the thickness thereof (not shown).

Because the thickness of the phase modulator 31D varies, the light interference generator 3D can change the direction of propagation of a light wave through refraction and achieves the same effect as the first modification.

Instead of configuring the phase modulator 31D with changing thickness, the direction of propagation of a light wave can be controlled by changing the gradient of phase modulation. The calculation unit 5 can change the gradient of phase modulation by adding a bias on a phase modulation amount. More specifically, the calculation unit 5 may be configured to increase or decrease the bias of phase modulation amount for each pixel (address) of the phase modulator 31D.

Fourth Modification: Concave Shaped Reflector

Figure 6:
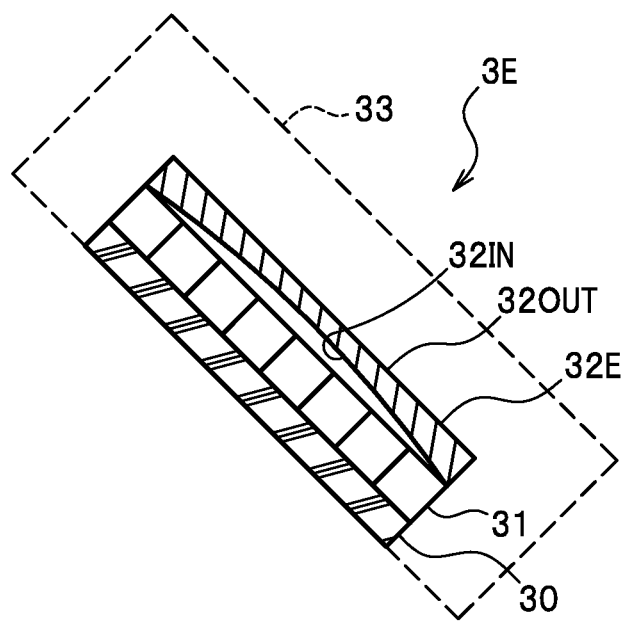
FIG. 6 is a schematic block diagram of a light interference generator in accordance with a fourth modification.

A light interference generator 3E according to a fourth modification will be described on a point that differs from the first embodiment. As shown in FIG. 6, the light interference generator 3E differs from the first embodiment in that the reflector 32E is concave in shape.

Configurations other than the configuration of the reflector 32E are the same as those of the first embodiment and will therefore not be described.

A reflecting face 32IN of the reflector 32E is concave shaped. Therefore, the reflector 32E includes a reflecting face 32IN that includes a cylindrical surface so that the reflector 32E becomes thinner at the center portion compared to either end. A gap between the phase modulator 31 and the reflecting surface 32IN becomes greater at the center portion. The flat face 32OUT on the back side of the reflector 32E is parallel to the phase modulator 31.

Because the reflector 32E is concave in shape, the light interference generator 3E can alter the difference in the radius of curvature of a wavefront between a light wave that passes through the phase modulator 31 and a light wave that does not pass through the phase modulator 31. As a result, the light interference generator 3E can generate an intensity distribution of interference light that is concentric like the Fresnel zone plate.

Fifth Modification: Convex-Shaped Reflector

Figure 7:
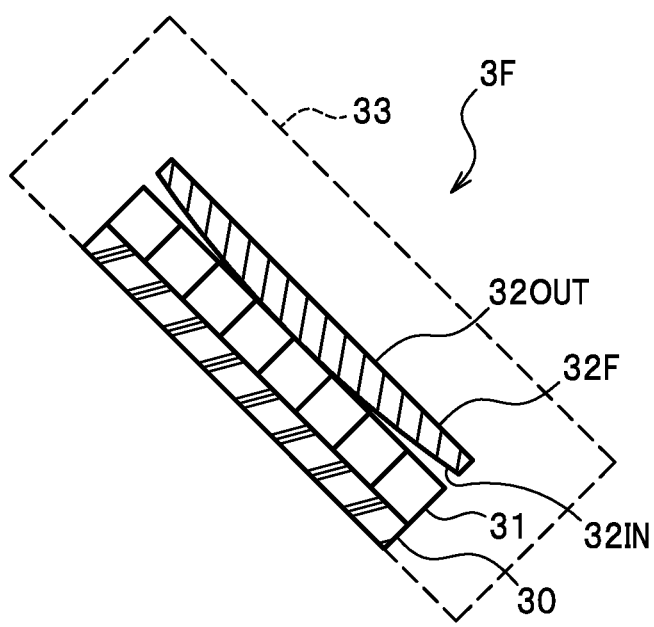
FIG. 7 is a schematic block diagram of a light interference generator in accordance with a fifth modification.

A light interference generator 3F according to a fifth modification will be described on a point that differs from the first embodiment. As shown in FIG. 7, the light interference generator 3F differs from the first embodiment in that the reflector 32F is convex in shape.

Configurations other than the configuration of the reflector 32F are the same as those of the first embodiment and will therefore not be described.

A reflecting face 32IN of the reflector 32F is concave shaped. Therefore, the reflector 32F includes a reflecting face 32IN with a cylindrical surface so that the reflector 32F becomes thicker at the center portion compared to either end. A gap between the phase modulator 31 and the reflecting surface 32IN becomes greater at either end. The flat face 32OUT on the back side of the reflector 32F is parallel to the phase modulator 31.

In this way, because the reflector 32F is convex shaped, the light interference generator 3F can change the difference in the radius of curvature of a wavefront and thus achieves the same effect as the fourth modification.

Sixth Modification: Concave-Shaped Light Wave Splitter

Figure 8:
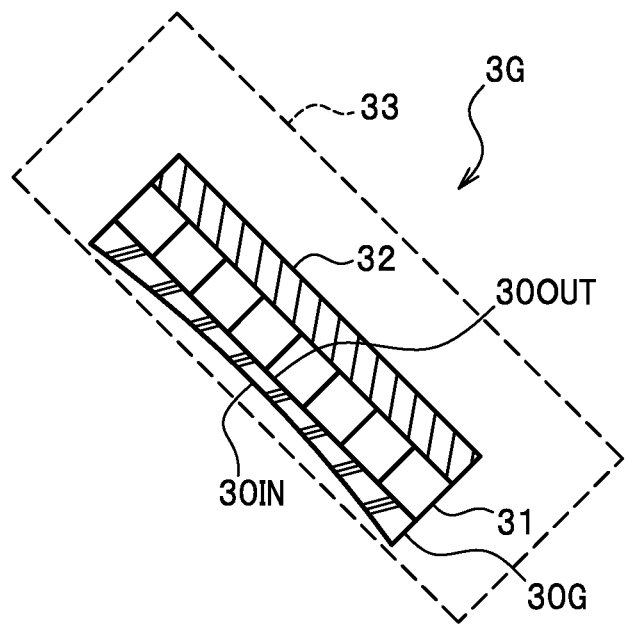
FIG. 8 is a schematic block diagram of a light interference generator in accordance with a sixth modification.

A light interference generator 3G according to a sixth modification will be described on a point that differs from the first embodiment. As shown in FIG. 8, the light interference generator 3G differs from the first embodiment in that the light wave splitter 30G is concave in shape.

Configurations other than the configuration of the light wave splitter 30G are the same as those of the first embodiment and will therefore not be described.

An incident light receiving face 30IN of the light wave splitter 30G is concave shaped. Therefore, the light wave splitter 30G includes an incident light receiving face 30IN with a cylindrical surface so that the light wave splitter 30G becomes thinner at the center portion compared to either end. An incident light exiting face 30OUT of the light wave splitter 30G is parallel to the phase modulator 31.

Note that the light wave splitter 30G may be configured so that, instead of the incident light receiving face 30IN, the incident light exiting face 30OUT is concave shaped (not shown).

In this way, because the light wave splitter 30G is concave shaped, the light interference generator 3G can change the difference in the radius of curvature of a wavefront and thus achieves the same effect as the fourth modification.

Seventh Modification: Convex-Shaped Light Wave Splitter

Figure 9:
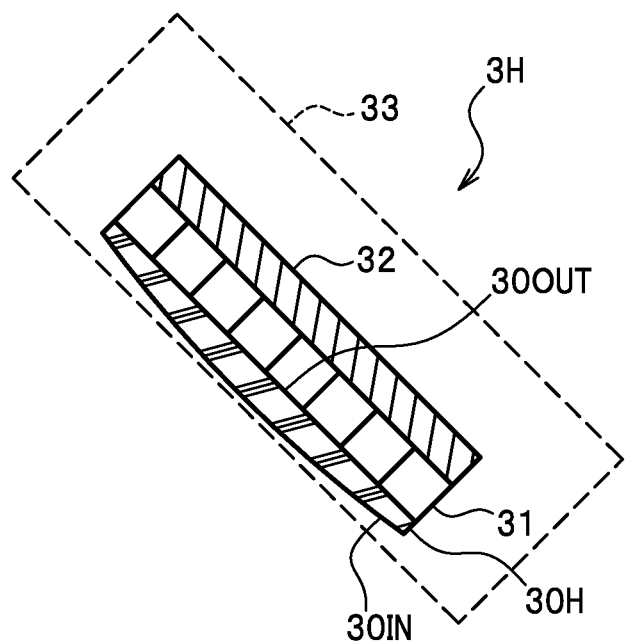
FIG. 9 is a schematic block diagram of a light interference generator in accordance with a seventh modification.

A light interference generator 3H according to a seventh modification will be described on a point that differs from the first embodiment. As shown in FIG. 9, the light interference generator 3H differs from the first embodiment in that the light wave splitter 30H is convex in shape.

Configurations other than the configuration of the light wave splitter 30H are the same as those of the first embodiment and will therefore not be described.

An incident light receiving face 30IN of the light wave splitter 30H is convex shaped. Therefore, the light wave splitter 30H includes an incident light receiving face 30IN with a cylindrical surface so that the light wave splitter 30H becomes thicker at the center portion compared to either end. An incident light exiting face 30OUT of the light wave splitter 30H is parallel to the phase modulator 31.

Note that the light wave splitter 30H may be configured so that, instead of the incident light receiving face 30IN, the incident light exiting face 30OUT is convex shaped (not shown).

In this way, because the light wave splitter 30H is convex shaped, the light interference generator 3H can change the difference in the radius of curvature of a wavefront and thus achieves the same effect as the fourth modification.

Eighth Modification: Utilization of Polarization Property

Figure 10:
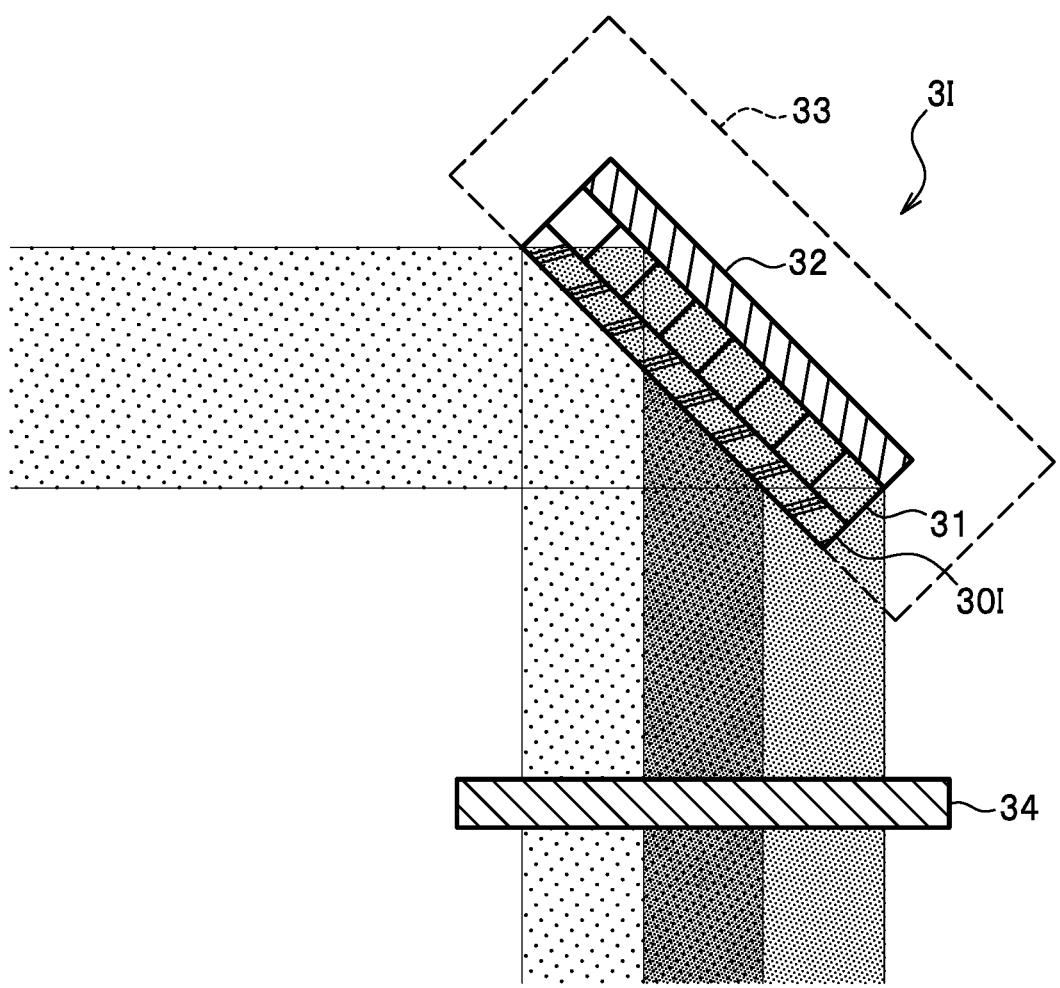
FIG. 10 is a schematic block diagram of a light interference generator in accordance with an eighth modification.

A light interference generator 3I according to an eighth modification will be described on a point that differs from the first embodiment. As shown in FIG. 10, the light interference generator 3I differs from the first embodiment in that the light interference generator 3I uses a polarization property.

Configurations other than the configuration of a light wave splitter 30I and a polarizer 34 are the same as those of the first embodiment and will therefore not be described.

The light wave splitter 30I is a light wave splitting and polarizing element that splits incident light emitted from the light source 2 into two light waves of different polarization directions. The light wave splitter 30I reflects a light wave of a certain polarization direction towards the reflector 32 and allows a light wave of another polarization direction to pass through to the phase modulator 31.

The polarizer 34 is configured to align the polarization directions of incident light that has been reflected by the light wave splitter 30I and incident light that has undergone phase modulation by the phase modulator 31. Light waves that pass through the polarizer 34 have their polarization components aligned and become interference light that illuminates strikes the image sensor 4 (FIG. 1).

By using, as the light wave splitter 30I, a light wave splitting and polarizing element that splits incident light emitted from the light source 2 into two light waves of different polarization directions and by arranging the polarizer 34 along the optical path, the light interference generator 3I can improve the visibility of interference fringes.

Furthermore, a waveplate, calcite, a birefringent lens, or another birefringent material may be inserted either before the light interference generator 3I or between the light interference generator 3I and the polarizer 34. By doing so, a difference in the optical path length between a light wave of the certain polarization direction and a light wave of the other polarization direction can be adjusted and the visibility of interference fringes can be improved. In this way, polarization can be used to adjust the difference in optical path lengths to become close to 0. In a case where the phase modulator 31 includes a polarization property, by matching the other polarization direction that is allowed to pass through the light wave splitter 30I and a polarization direction in which phase modulation is performed by the phase modulator 31, a phase of a light wave can be modulated with high light utilization efficiency, thereby improving the visibility of interference fringes. The present modification is applicable to one or more embodiments that use a polarization-sensitive phase modulator.

Second Embodiment: Transmission Type

<Interference Imaging Device>

An interference imaging device 100 according to a second embodiment will be described with reference to FIG. 11.

Figure 11:
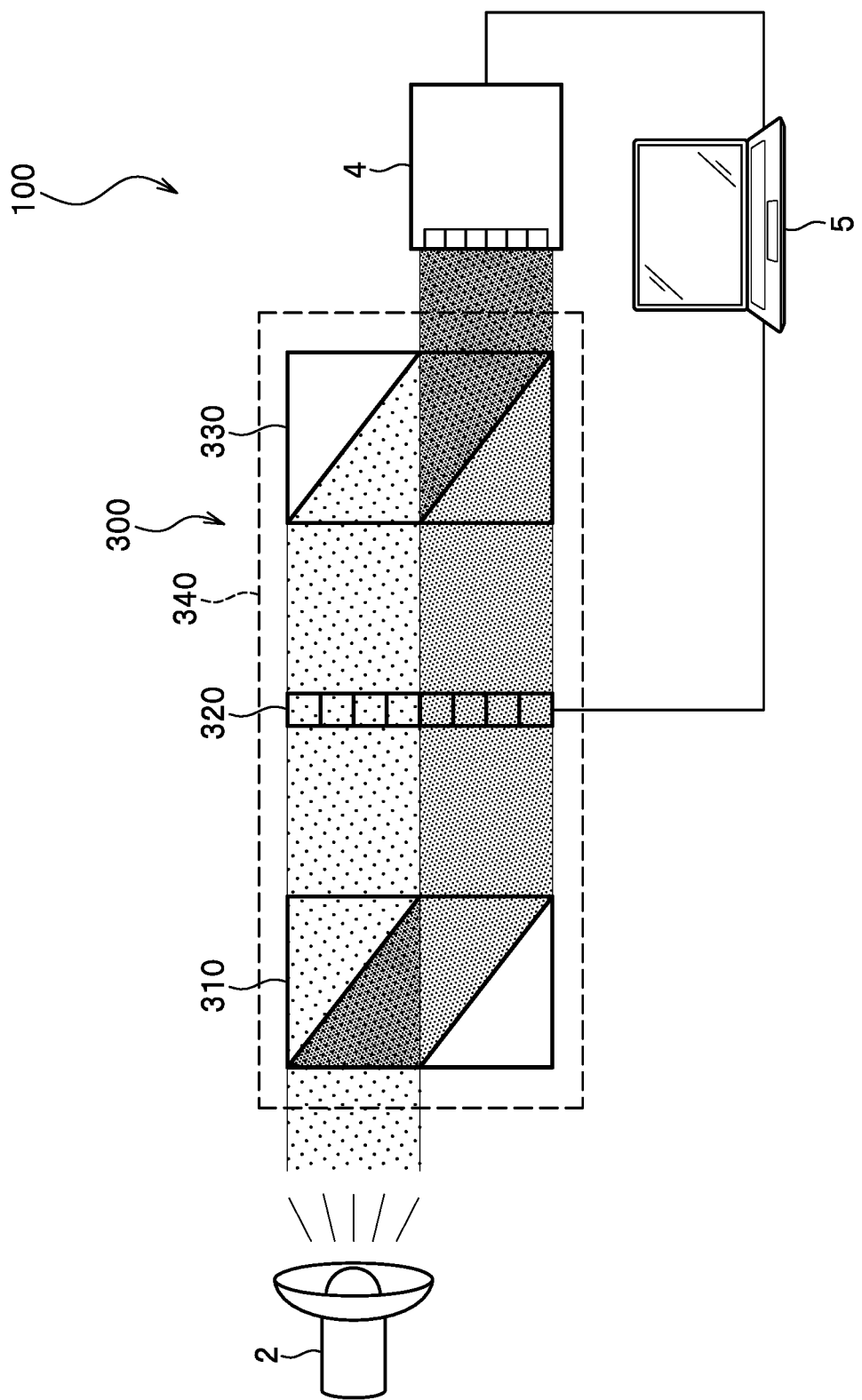
FIG. 11 is a schematic block diagram of an interference imaging device in accordance with a second embodiment.

As show in FIG. 11, the interference imaging device 100 is a common-path type interferometer that generates a complex amplitude image and includes a light source 2, an image sensor 4, a calculation unit 5, and a light interference generator 300. The interference imaging device 100 according to the second embodiment is a transmission type that transmits incident light.

In FIG. 11, so that incident light from the light interference generator 300 can be incident on it, the image sensor 4 is arranged on a lateral side of the light interference generator 300.

Configurations other than the configuration of the light interference generator 300 are the same as those of the first embodiment and will therefore not be described.

<Light Interference Generator>

The light interference generator 300 will be described in detail with reference to FIG. 12.

Figure 12:
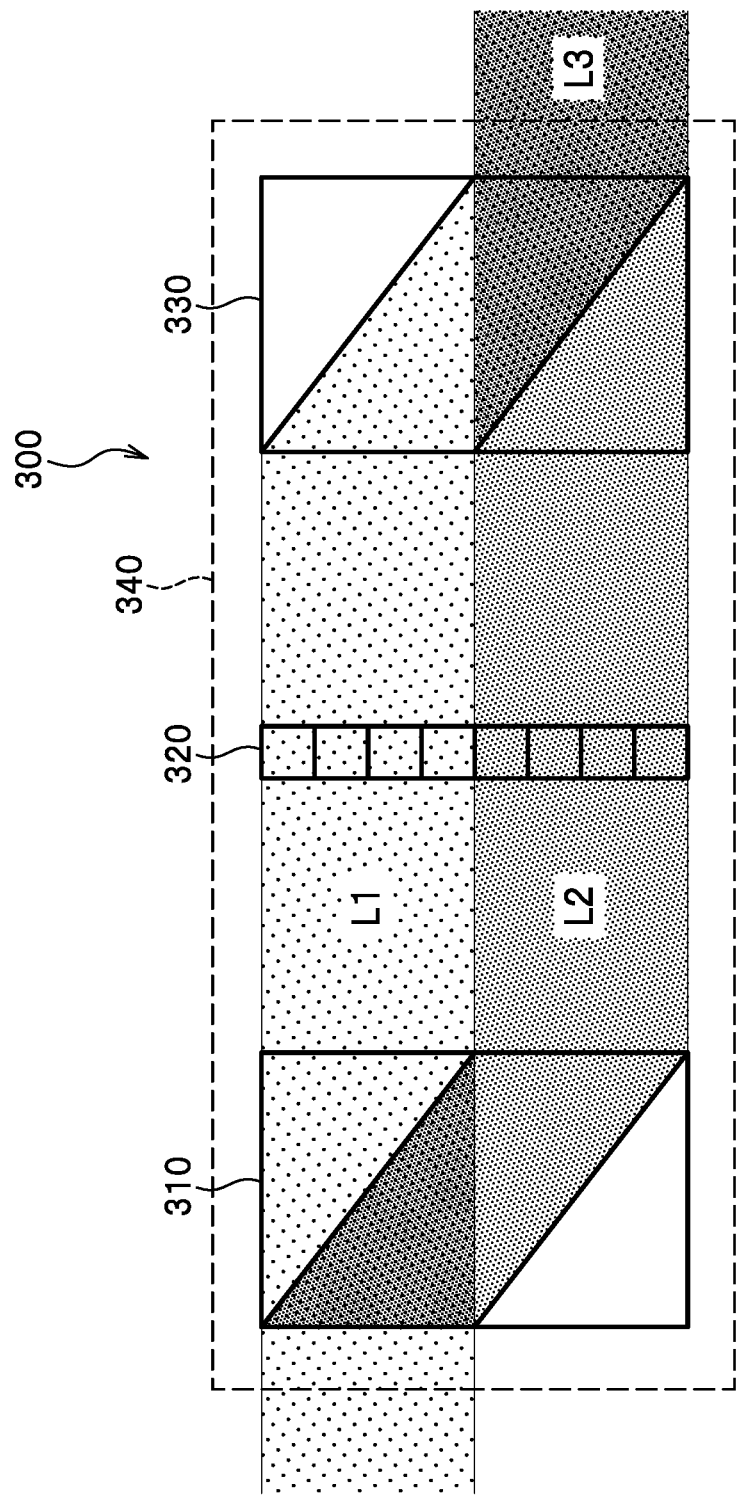
FIG. 12 is a schematic block diagram of a light interference generator shown in FIG. 11.

As shown in FIG. 12, the light interference generator 300 includes a light wave splitter 310, a phase modulator 320, a light wave coupler 330, and a housing 340.

In FIG. 12, first split light of incoming light that has been split by the light wave splitter 310, light L1, is shown by dots of light density. In FIG. 12, second split light of incoming light that has been split by the light wave splitter 310, light L2 is shown by dots of medium density. Light L3 in which light L1 and light L2 overlap are shown by dots of very high density.

Figure 13:
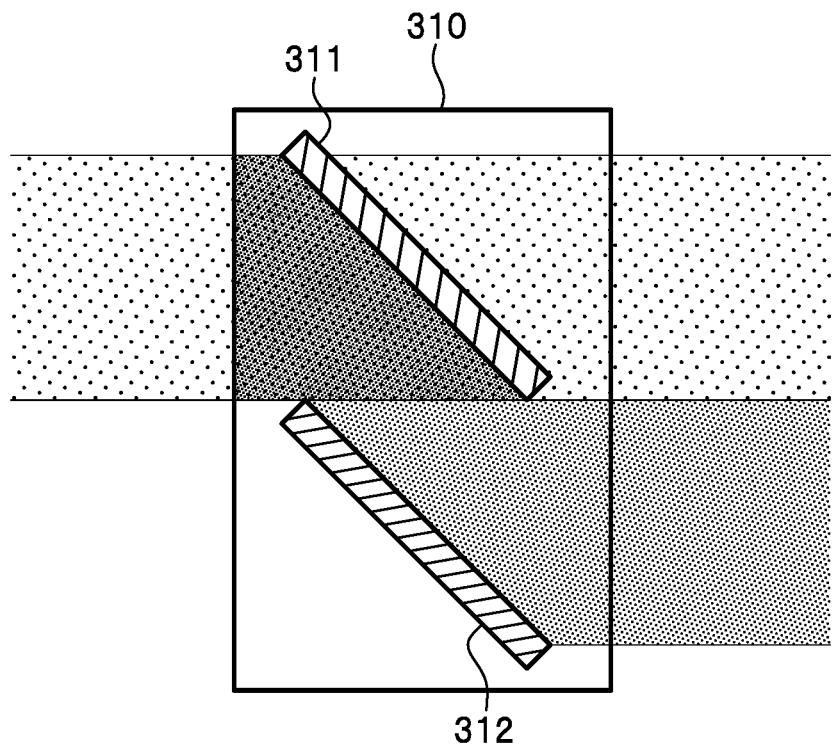
FIG. 13 is a diagram for explaining a first example of a light wave splitter in a second embodiment.

The light wave splitter 310 is configured to split incident light that has been emitted by the light source 2 into two light waves (light L1 and light L2). For example, the light wave splitter 310 may include a combination of a beam splitter 311 and a reflecting mirror 312 as shown in FIG. 13. The beam splitter 311 (for example, a 50% beam splitter) reflects a part of the incident light from the light source 2 towards the reflecting mirror 312 and transmits the remaining incident light to the phase modulator 320. The reflecting mirror 312 reflects said part of the incident light from the beam splitter 311 to the phase modulator 320. In other words, incident light from the light source 2 is split by the light wave splitter 310 into two parallel light waves that illuminate strike different parts of the phase modulator 320.

Figure 14:
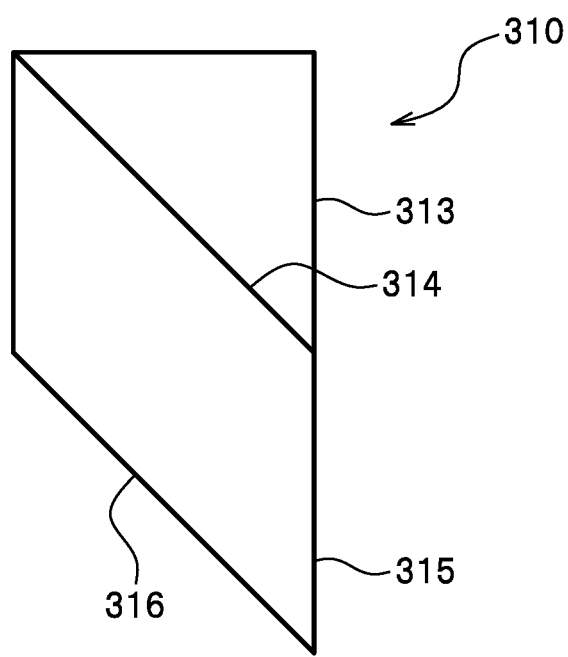
FIG. 14 is a diagram for explaining a second example of a light wave splitter in a second embodiment.

As shown in FIG. 14, the light wave splitter 310 may include a transparent member 313 in the shape of a triangular prism, a transmission layer 314, a transparent member 315 in the shape of a parallelepiped, and a reflecting layer 316 that are integrated together. The transparent members 313 and 315 are members that transmit incident light, such as glass. The transmission layer 314 is formed at an interface between transparent members 313 and 315. The transmission layer 314 reflects a part of the incident light to the reflecting layer 316 and transmits the remaining incident light to the phase modulator 320. The transmission layer 314 can for example be a 50% beam splitter or a transmission film with a predetermined reflectance and refractive index. The reflecting layer 316 is formed on a flat face of the transparent member 315 opposing the transmission layer 314. The reflecting layer 316 reflects the part of the incident light coming from the transmission layer 314 to the phase modulator 320. Because components of the light wave splitter 310 are integrated, the light wave separator 310 is robust to vibrations.

The ratio by which the light wave splitters 310 of FIGS. 13 and 14 split incident light into two light waves may be any ratio and is not limited to a 1:1 ratio like a 50% beam splitter.

Returning to FIG. 12, a description of the light interference generator 300 will be continued. The phase modulator 320 is configured to perform phase modulation of first split light (light L1) of the incident light that has been split by the light wave splitter 310 and to allow second split light (light L2) of the incident light that has been split by the light wave splitter 310 to pass through. The phase modulator 320 is arranged to face the light wave splitter 310. In the present embodiment, the phase modulator 320 receives as input a phase modulation pattern that is temporally or spatially different for each wavelength from the calculation unit 5. The phase modulator 320 phase modulates one split light of the incident light based on the phase modulation pattern. For example, the phase modulator 320 phase modulates and transmits one split light of the incident light that has been reflected by the reflecting mirror 312 and transmits without phase modulation another split light of the incident light that comes from the beam splitter 311. The phase modulator 320 may compensate for wavefront distortion of the other split light of the incident light that comes from the beam splitter 311. In this way, because one split light and another split light of the incident light passes through different parts of the phase modulator 320, the phase modulator 320 can phase modulate each split light of the incident light separately and can expand a phase modulation range (approximately twice).

Examples of the phase modulator 320 include the examples that were disclosed for the phase modulator 31 of FIG. 1 except for those that are unique to the reflector type.

The light wave coupler 330 is configured to combine the first split light (light L1) of the incident light and the second split light (light L2) of the incident light that are transmitted from the phase modulator 320 to form interference light (light L3). The light wave coupler 330 is configured to change the direction of the first split light of the incident light transmitted from the phase modulator 320 so that the first split light combines and overlaps with the second split light. The light wave coupler 330 is arranged to face the phase modulator 320.

The light wave coupler 330 may for example include a combination of a beam splitter and a reflecting mirror in the same way as the light wave splitter 310 of FIG. 13. The reflecting mirror reflects the first split light of the incident light transmitted from the phase modulator 320 to a beam splitter reflecting mirror. The beam splitter transmits the second split light of the incident light that has been transmitted from the phase modulator 320. Furthermore, the beam splitter reflects the first split light of the incident light reflected from the reflecting mirror. The light wave coupler 330 may have an integrated configuration in the same way as the light wave splitter 310 of FIG. 14.

The housing 340 (FIG. 11) is configured to house the light wave splitter 310, the phase modulator 320, and the light wave coupler 330 (the housing is outlined with a broken line in the drawing). The housing 340 may for example be a box-shaped case formed from a metal. The housing 340 includes openings (not shown) that expose a face of the light wave splitter 310 from which light enters and a face of the light wave coupler 330 from which light is transmitted out. Inside the housing 340, the light wave splitter 310, the phase modulator 320, and the light wave coupler 330 are space apart from each other, but in one or more embodiments, may be adjacent to each other.

From the configuration described above, the light interference generator 300 can generate interference light (light L3). To recapitulate, incident light from the light source 2 is split by the light wave splitter 310 into light L1, which is light to be phase modulated by the phase modulator 320, and light L2, which is light that will not be phase modulated by the phase modulator 320. One of the split light, light L1, upon passing through the light wave splitter 30, is phase modulated by the phase modulator 31. Then, the two light L1 and L2 that have been transmitted from the phase modulator 31 are combined by the light wave coupler 330. As a result, interference occurs in a portion where the light L1, which has been phase modulated by the phase modulator 320, and the light L2, which has not been phase modulated by the phase modulator 320, overlaps, generating interference light, light L3. The interference light then illuminates strikes the image sensor 4.

Effects

Unlike the two-beam interferometer 9 (FIG. 29), the interference imaging device 100 does not need to form separate optical paths for object light and reference light. Therefore, configuration can be simplified. Furthermore, because an imaging lens is unnecessary, the interference imaging device 100 can be miniaturized.

Furthermore, because, the interference imaging device 100 can use light source 2 that emits incoherent light (for example, general lighting equipment or sunlight), versatility is improved.

Furthermore, because the interference imaging device 100 uses a phase modulator 320 that operates at high speed, real-time performance is enhanced.

Furthermore, because a mechanical drive is not needed, the interference imaging device 100 is robust against vibrations compared to a two-beam interferometer 9 and can be moved around easily. Therefore, reliability and convenience is improved.

Third Embodiment

<Light Interference Generator>

A light interference generator 300B according to a third embodiment will be described on a point that differs from the second embodiment with reference to FIGS. 15A and 15B.

Figure 15A:
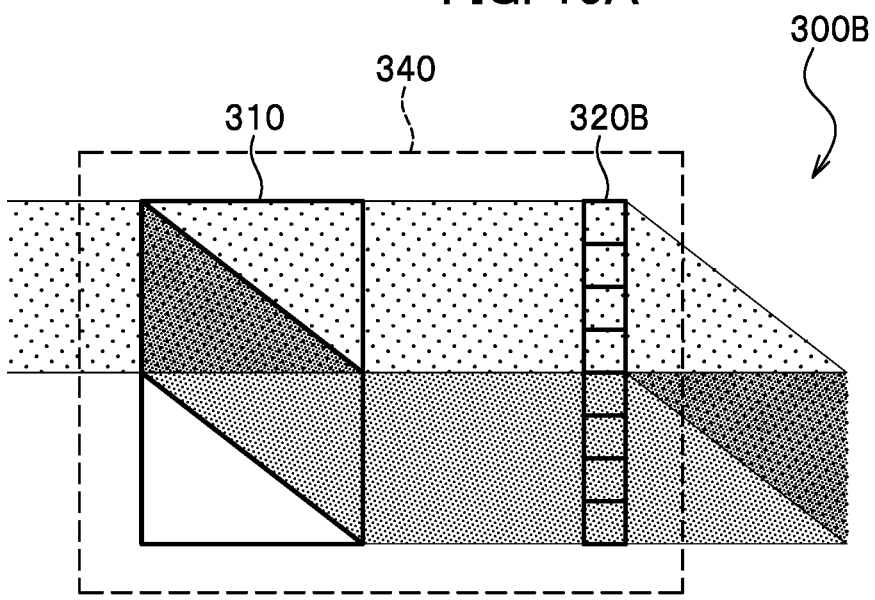
FIG. 15A is a schematic block diagram of a light interference generator in accordance with a third embodiment.

As show in FIG. 15A, the light interference generator 300B differs from the second embodiment in that the light interference generator 300B does not include a light wave coupler 330 (FIG. 12). The light interference generator 300B includes a light wave splitter 310, a phase modulator 320B, and a housing 340.

Configurations other than the configuration of the phase modulator 320B are the same as those of the second embodiment and will therefore not be described.

The phase modulator 320B is configured to phase modulate the phase of one split light of the incident light that has been split by the light wave splitter 310 and to output interference light that is obtained by overlapping said one split light with another split light of the incident light that has been split by the light wave splitter 310. Because the light interference generator 300B does not include a light wave coupler 330, the phase modulator 320B is configured to change the direction of the other split light (shown by coarse dots) of the incident light that has been split by the light wave splitter 310. In the present embodiment, the phase modulator 320B receives, as input from the calculation unit 5, a phase modulation pattern for phase modulating said one split light (shown by fine dots) of the incident light and a control signal to diffract the other split light of the incident light. The phase modulator 320B modulates said one split light of the incident light based on the phase modulation pattern and diffracts the other split light of the incident light based on the control signal.

Figure 15B:
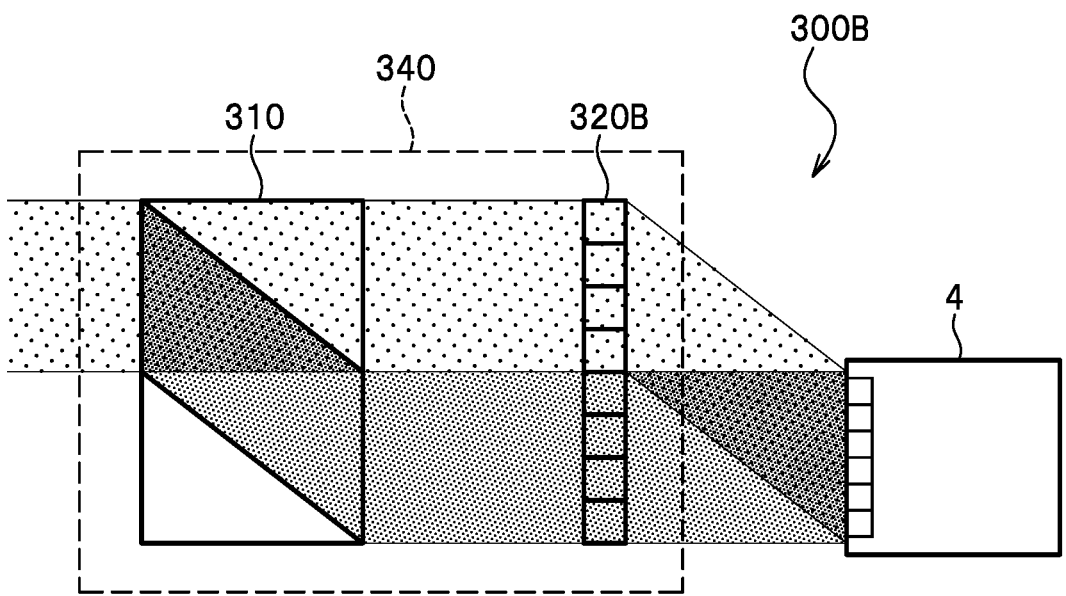
FIG. 15B is a diagram for explaining an arrangement of an image sensor.

Because the light interference generator 300B does not include a light wave coupler 330, the image sensor 4 is arranged to be at a position where, as shown in FIG. 15B, said one split light of the incident light and the other split light of the incident light overlap with each other. The position of the image sensor 4 is not limited to a position where said one split light of the incident light and the other split light of the incident light completely overlap with each other. The image sensor 4 may be arranged so that it is at a position where at least a part of said one split light and the other split light overlap with each other (not shown).

In this way, although the light interference generator 300B does not include a light wave coupler 330, the same effects as those of the second embodiment are obtained. Furthermore, because the light wave coupler 330 can be omitted, the light interference generator 300B can be miniaturized further.

Fourth Embodiment

<Light Interference Generator>

Figure 16:
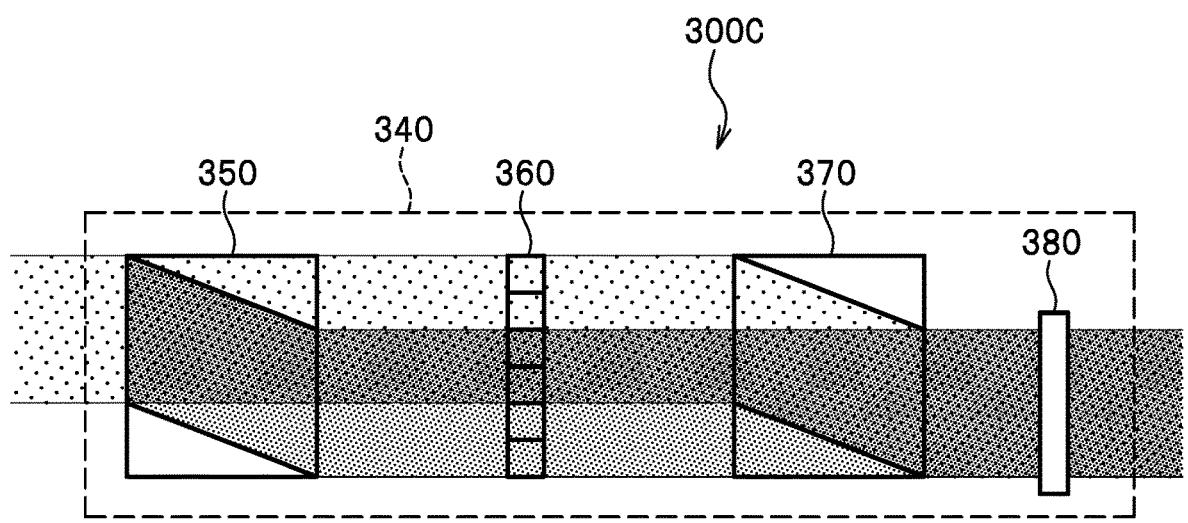
FIG. 16 is a schematic block diagram of a light interference generator in accordance with a fourth embodiment.

A light interference generator 300C according to a fourth embodiment will be described on a point that differs from the second embodiment with reference to FIG. 16.

The light interference generator 300C differs from the second embodiments in that the light interference generator 300C utilizes a polarization property. As shown in FIG. 16, the light interference generator 300C includes a housing 340, a light wave splitter and polarizer 350, a polarization-sensitive phase modulator 360, a light wave coupler and polarizer 370, and a polarizer 380.

The light wave splitter and polarizer 350 is configured to split incident light emitted from the light source 2 into two light waves whose directions of polarization are different from each other. In the present embodiment, the light wave splitter and polarizer 350 splits incident light into two light waves whose directions of polarization are orthogonal to each other. Therefore, incident light from the light source 2 is split into two light waves of different polarization directions by the light wave splitter and polarizer 350, and the two light waves that partially overlap travel in parallel with each other and illuminate the polarization-sensitive phase modulator 360. The light wave splitter and polarizer 350 may for example be formed using a polarizing prism such as a Wollaston prism, a calcite, or an alpha-BBO crystal.

The light wave splitter and polarizer 350 may have an integrated configuration in the same way as the light wave splitter 310 of FIG. 14. In this case, the transmission layer may be a member such as a polarizing beam splitter that transmits horizontally polarized light and reflects vertically polarized light. Because components are integrated, the light wave splitter and polarizer 350 is robust to vibrations.

The polarization-sensitive phase modulator 360 phase modulates incident light of a predetermined polarization direction (shown by fine dots) and allows incident light of another polarization direction (shown by coarse dots) to pass through. The incident light of a predetermined polarization direction and the incident light of another polarization direction are split parts of the incident light that has been split by the light wave splitter and polarizer 350. In the present embodiment, the polarization-sensitive phase modulator 360 receives, as input from the calculation unit 5, a phase modulation pattern that is temporally or spatially different for each wavelength. The polarization-sensitive phase modulator 360 phase modulates the incident light of a predetermined polarization direction based on the phase modulation pattern. The polarization-sensitive phase modulator 360 may compensate for wavefront distortion of the incident light of another polarization direction coming from the light wave splitter and polarizer 350.

The polarization-sensitive phase modulator 360 may for example be a reflective type spatial light modulator (liquid crystal on Silicon-spatial light modulator [LCOS-SLM]), a liquid crystal element, or an electro-optical element (electro-optic modulator [EOM]).

The light wave coupler and polarizer 370 is configured to combine the incident light of a predetermined polarization direction and the incident light of another polarization direction that are transmitted from the polarization-sensitive phase modulator 360. The light waves combined by the light wave coupler and polarizer 370 include different polarization components. The combined light waves illuminate strike the polarizer 380. The light wave coupler and polarizer 370 may for example be formed from a polarizing prism such as a Wollaston prism, a calcite, or an alpha-BBO crystal. The light wave coupler and polarizer 370 may have an integrated configuration like the light wave splitter and polarizer 350.

The polarizer 380 is configured to align the directions of polarization of the light waves combined by the light wave coupler and polarizer 370. Upon passing through the polarizer 380, the light waves whose polarization components are aligned become interference light that then illuminates strikes the image sensor 4 (FIG. 11).

In this way, the effects achieved by the second embodiment is similarly achieved by the light interference generator 300C. Furthermore, because the polarizer 380 is arranged along the optical path of the light interference generator 300C, visibility of interference fringes can be improved.

Ninth Modification: Phase Modulator of Non-Uniform Thickness

Figure 17:
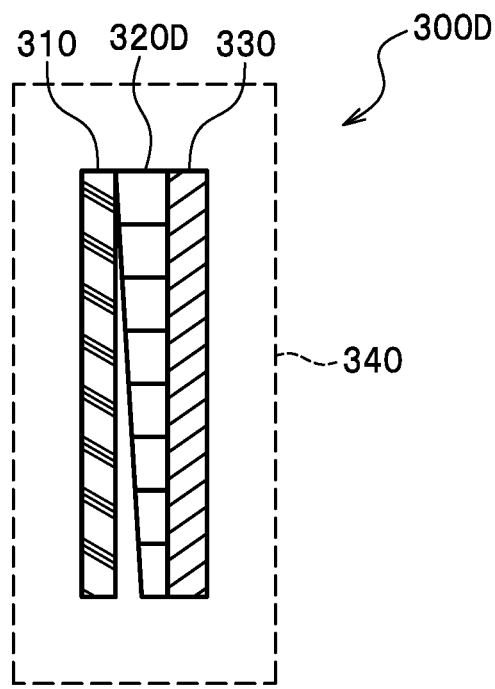
FIG. 17 is a schematic block diagram of a light interference generator in accordance with a ninth modification.

A light interference generator 300D according to a ninth modification will be described on a point that differs from the second embodiment. As shown in FIG. 17, the light interference generator 300D is different from the second embodiment in that a phase modulator 320D of the light interference generator 300D has varying thickness.

Since the thickness of the phase modulator 320D varies in the same way as the phase modulator 31D of FIG. 5, description of the phase modulator 320D will be omitted. Instead of configuring the phase modulator 320D to have varying thickness, a varying gradient of phase modulation may be used. Configurations other than the configuration of the phase modulator 320D are the same as those of the second embodiment and will therefore not be described. Although components of the light interference generator 300D are adjacent to one another, they may be spaced apart as in FIG. 11 (the same applies to the tenth to thirteenth modifications described later).

Because the phase modulator 320D has varying thickness, the light interference generator 300D can change a propagation direction of a light wave passing through the phase modulator 320D. As a result, an area of light wave interference increases making differential interference possible, and the light interference generator 300D is able to generate interference light easily.

Tenth Modification: Wedge-Shaped Light Wave Splitter

Figure 18:
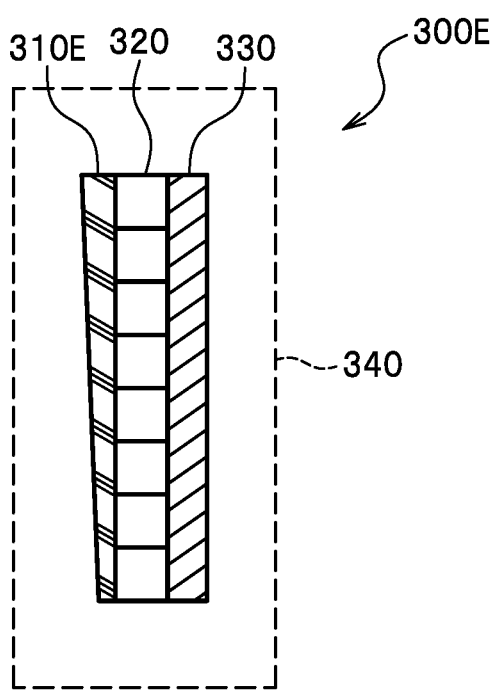
FIG. 18 is a schematic block diagram of a light interference generator in accordance with a tenth modification.

A light interference generator 300E according to a tenth modification will be described on a point that differs from the second embodiment. As shown in FIG. 18, the light interference generator 300E differs from the second embodiment in that the light wave splitter 310E of the light interference generator 300E is wedge shaped.

Since the light wave splitter 310E is wedge shaped in the same way as the light wave splitter 30C of FIG. 4, description thereof will be omitted. An advantageous effect that can be obtained by using a wedge-shaped light wave splitter can also be obtained with a light wave splitter 310 of FIG. 13 by inclining the beam splitter 311 and reflecting mirror 312 (which are shown to be parallel in FIG. 13) at different angles to each other (not shown). Configurations other than the configuration of the light wave splitter 310E are the same as those of the second embodiment and will therefore not be described.

Because the light wave splitter 310E is wedge shaped, a direction of propagation of a light wave can be changed, and the same effect as that of the ninth modification is obtained with light interference generator 300E.

Eleventh Modification: Concave-Shaped Light Wave Splitter

Figure 19:
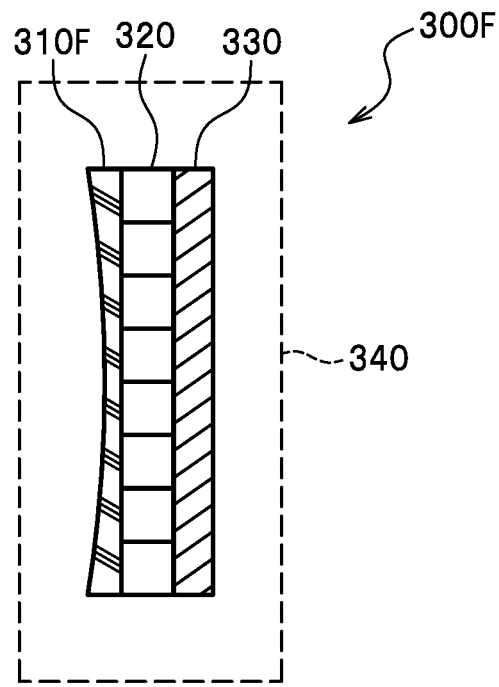
FIG. 19 is a schematic block diagram of a light interference generator in accordance with an eleventh modification.

A light interference generator 300F according to an eleventh modification will be described on a point that differs from the second embodiment. As shown in FIG. 19, the light interference generator 300F differs from the second embodiment in that the light wave splitter 310F of the light interference generator 300F is concave shaped.

Since the light wave splitter 310F is concave shaped in the same way as the light wave splitter 30G of FIG. 8, description thereof will be omitted. Configurations other than the configuration of the light wave splitter 310F are the same as those of the second embodiment and will therefore not be described.

Since the light wave splitter 310F is concave shaped, the light interference generator 300F can change the difference in the radius of curvature of a wave front of light waves that pass through the phase modulator 320. In this way, the light interference generator 300F can generate an intensity distribution of interference light that is concentric like a Fresnel zone plate.

Twelfth Modification: Convex-Shaped Light Wave Splitter

Figure 20:
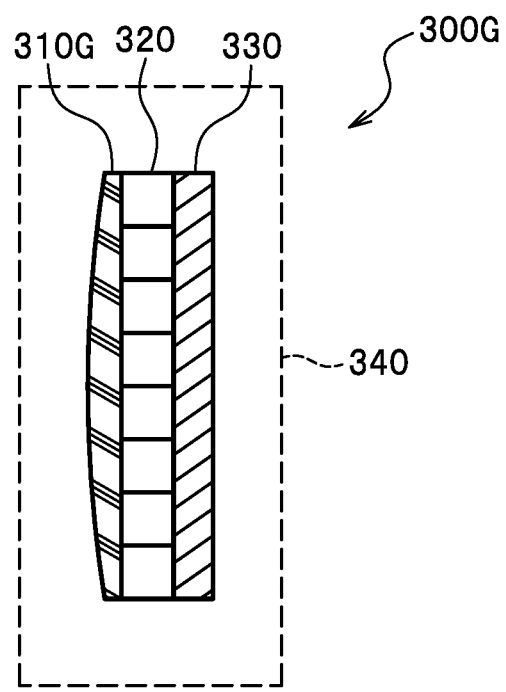
FIG. 20 is a schematic block diagram of a light interference generator in accordance with a twelfth modification.

A light interference generator 300G according to a twelfth modification will be described on a point that differs from the second embodiment. As shown in FIG. 20, the light interference generator 300G differs from the second embodiment in that the light wave splitter 310G of the light interference generator 300F is convex shaped.

Since the light wave splitter 310G is convex shaped in the same way as the light wave splitter 30H of FIG. 9, description thereof will be omitted. Configurations other than the configuration of the light wave splitter 310G are the same as those of the second embodiment and will therefore not be described.

Since the light wave splitter 310G is convex shaped, the light interference generator 300G can change the difference in the radius of curvature of a wave front and thus achieves the same effect as the eleventh modification.

Thirteenth Modification: Concave-Shaped Light Wave Coupler

Figure 21:
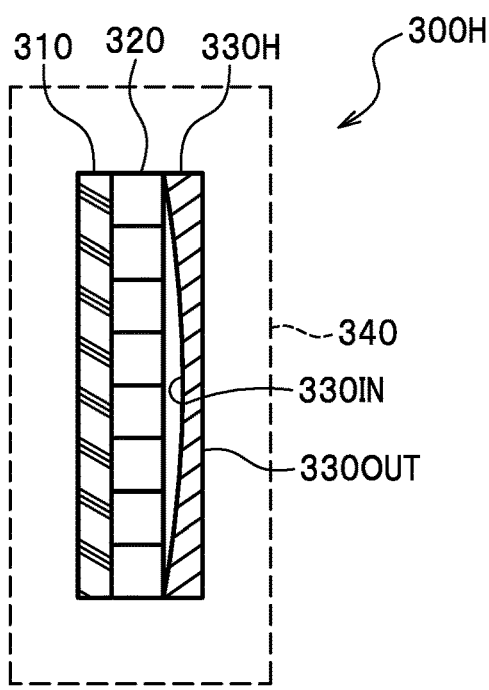
FIG. 21 is a schematic block diagram of a light interference generator in accordance with a thirteenth modification.

A light interference generator 300H according to a thirteenth modification will be described on a point that differs from the second embodiment. As shown in FIG. 21, the light interference generator 300H differs from the second embodiment in that the light wave coupler 330H of the light interference generator 300H is concave shaped.

Configurations other than the configuration of the light wave coupler 330H are the same as those of the second embodiment and will therefore not be described.

The light wave coupler 330H is configured so that a light receiving face 330IN thereof is concave shaped. Therefore, the light wave coupler 330H includes a light receiving face 330IN with a cylindrical surface so that the light wave coupler 330H becomes thinner at the center portion compared to either end. A light exiting face 330OUT of the light wave coupler 330H is parallel to the phase modulator 320.

Since the light wave coupler 330H is concave shaped, the light interference generator 300H can change the difference in the radius of curvature of a wave front and thus achieves the same effect as the eleventh modification.

Fourteenth Modification: Convex-Shaped Light Wave Coupler

Figure 22:
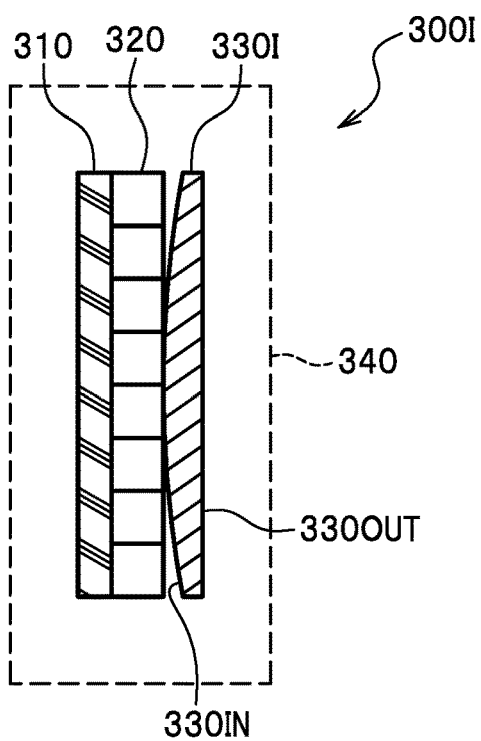
FIG. 22 is a schematic block diagram of a light interference generator in accordance with a fourteenth modification.

A light interference generator 300I according to a fourteenth modification will be described on a point that differs from the second embodiment. As shown in FIG. 22, the light interference generator 300I differs from the second embodiment in that the light wave coupler 330I of the light interference generator 300I is convex shaped.

The light wave coupler 330I is configured so that a light receiving face 330IN thereof is convex shaped. Therefore, the light wave coupler 330I includes a light receiving face 330IN with a cylindrical surface so that the light wave coupler 330I becomes thicker at the center portion compared to either end. A light exiting face 330OUT of the light wave coupler 330I is parallel to the phase modulator 320.

Since the light wave coupler 330I is convex shaped, the light interference generator 300I can change the difference in the radius of curvature of a wave front and thus achieves the same effect as the eleventh modification.

Figure 23:
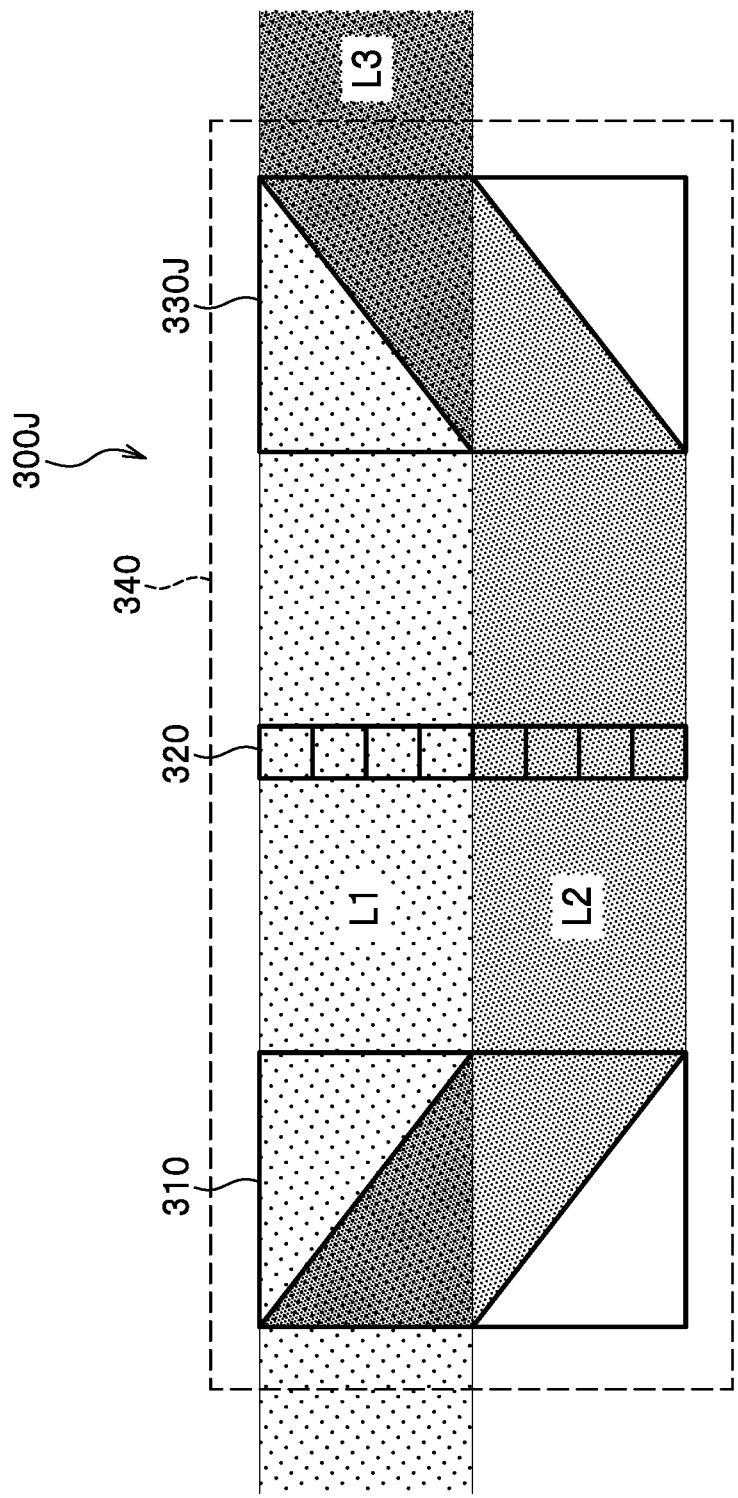
FIG. 23 is a schematic block diagram of a light interference generator in accordance with a fifteenth modification.

Fifteenth Modification: Light Wave Coupler with Inverted Course of Exiting Light A light interference generator 300J according to a fifteenth modification will be described on a point that differs from the second embodiment. As shown in FIG. 23, the light interference generator 300J differs from the second embodiment in that the course along which exiting light travels is inverted from that of the light wave coupler 330 of FIG. 12.

Configurations other than the configuration of the light wave coupler 330J are the same as those of the second embodiment and will therefore not be described. The light wave coupler 330J is applicable to the fourth embodiment that utilizes a polarization property.

The light wave coupler 330J changes the direction of second split light, light L2, of the incident light transmitted from the phase modulator 320 so that the second split light combines and overlaps with first split light, light L1, of the incident light. In other words, the course of light exiting the light wave coupler 330J is on an upper side compared to the course of light exiting the light wave coupler 330 of FIG. 12 which is on a lower side. Because of this, compared to the optical path of one split light of the incident light, the optical path of another split light of the incident light is greater in length.

Because of the difference in optical path lengths of the first split light and the second split light, the light interference generator 300J can generate intensity distribution of interference light that is concentric.

Common examples of use of the interference imaging device 1 according to the first embodiment (FIG. 1) will be described as sixteenth to twenty-first modifications. The interference imaging device 1 can for example be used as a sensing system, a spectral image sensing system, a lensless three-dimensional (3D) image sensing system, or a quantitative phase image sensing system.

Sixteenth Modification: Integrated Light Wave Splitter and Light Wave Coupler

Figure 24:
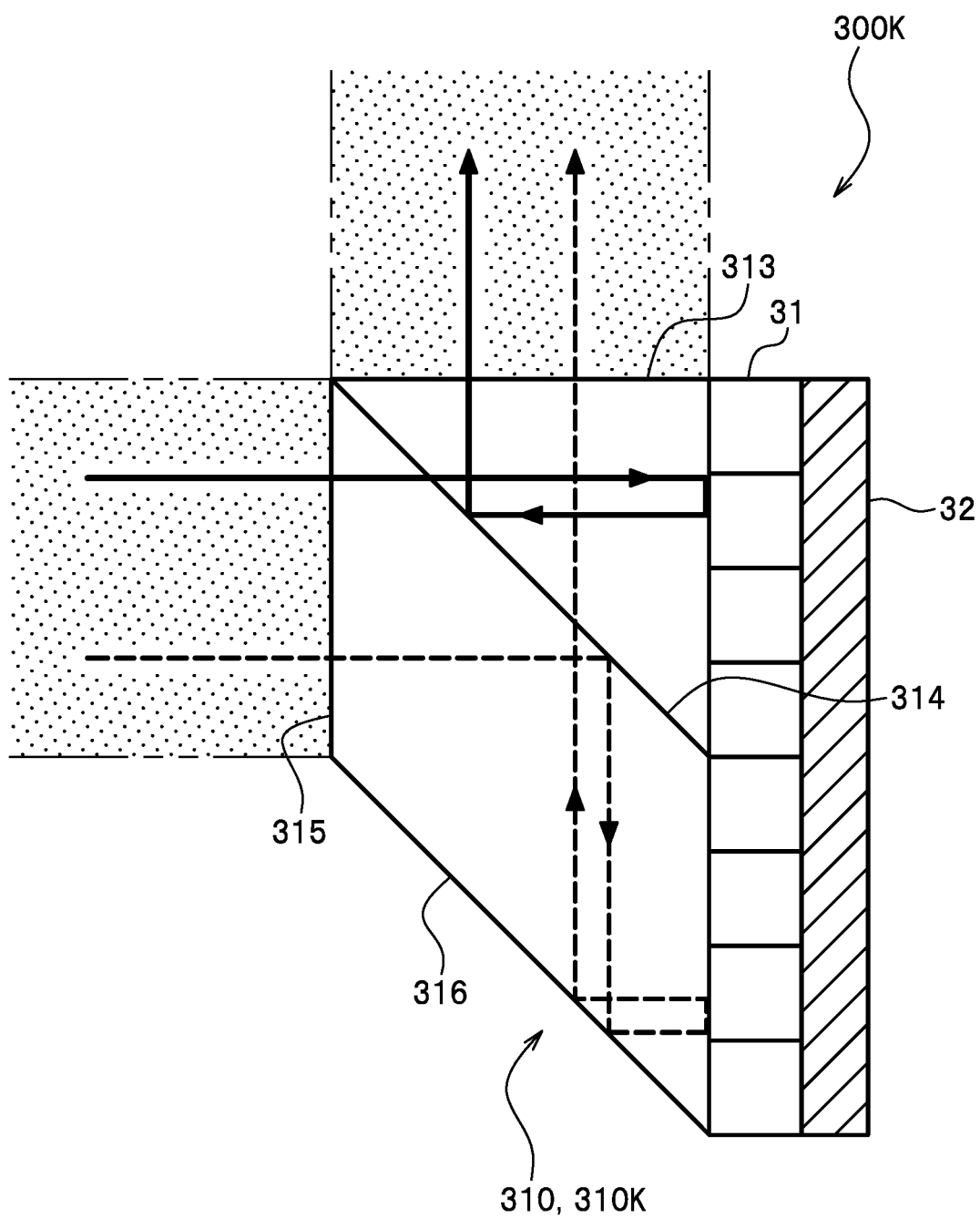
FIG. 24 is a schematic block diagram of a light interference generator in accordance with a sixteenth modification.

A light interference generator 300K according to a sixteenth modification will be described on a point that differs from the second embodiment. As shown in FIG. 24, the light interference generator 300K is configured so that the light wave splitter and the light wave coupler are integrated. The light interference generator 300K includes a light wave splitter and coupler 310K, a phase modulator 31, and a reflector 32. The phase modulator 31 and reflector 32 are the same as those of the first embodiment and will therefore not be described below.

The light wave splitter and coupler 310K is configured to split incident light emitted from a light source 2 into two light waves and combine two kinds of light transmitted from the phase modulator 31 into interference light. A configuration of the light wave splitter and coupler 310K is the same as the configuration of the light wave splitter 310 of FIG. 14.

The transmission layer 314 reflects a part of the incident light to the reflecting layer 316 and transmits the remaining part of the incident light to the phase modulator 31320. In FIG. 24, a direction of travel of said part of the incident light is shown by a dashed arrow and a direction of travel of the remaining part of the incident light is shown by a solid arrow.

Said part of the incident light (dashed line) is reflected by the reflecting layer 316 and is phase modulated after illuminating striking the phase modulator 31. Then, said part of the incident light is again reflected by the reflecting layer 316, passes through the transmission layer 314, and illuminates strikes an image sensor 4 (FIG. 11). The remaining part of the incident light (solid line), after illuminating striking the phase modulator 31, is reflected by the transmission layer 314 and illuminates strikes the image sensor 4. Interference occurs where the light that has been phase modulated by the phase modulator 31 and the light that has not been phase modulated by the phase modulator 31 overlaps, and interference light is generated.

As described above, the light interference generator 300K can expand the phase modulation range (approximately by four times) in addition to achieving the same effects as those of the second embodiment. Furthermore, a unified light wave splitter and light wave coupler means that the light interference generator 300K can be miniaturized. Yet further, the light interference generator 300K improves design flexibility because the image sensor 4 can be arranged on an upper side.

Seventeenth Modification: Sensing System

Returning to FIG. 1, a seventeenth modification that uses the interference imaging device 1 as a sensing system will be described. First, a case where the light source 2 emits light of a single wavelength is considered. In this case, the light interference generator 3 generates interference light by phase modulating a part of the incident light and then the image sensor 4 detects the interference light generated by the light interference generator 3. The calculation unit 5 calculates complex amplitude distribution of a light wave from information of a plurality of interference light of different phase shifts. The calculation unit 5 performs numerical calculation of light wave propagation and constructs an image of an object (a complex amplitude image).

Second, a case where the light source 2 emits light of multiple wavelengths is considered. In this case, the light interference generator 3 generates interference light by phase modulating a part of the incident light and then the image sensor 4 detects the interference light generated by the light interference generator 3. From information on interference light of multiple wavelengths, the calculation unit 5 calculates complex amplitude distribution of a light wave for each wavelength by using a computational coherent superposition with wavelength dependency or a Fourier spectroscopy algorithm. The calculation unit 5 performs numerical calculation of light wave propagation for each wavelength and constructs an image of an object (a complex amplitude image).

Eighteenth Modification: Spectral Image Sensing System

Figure 25:
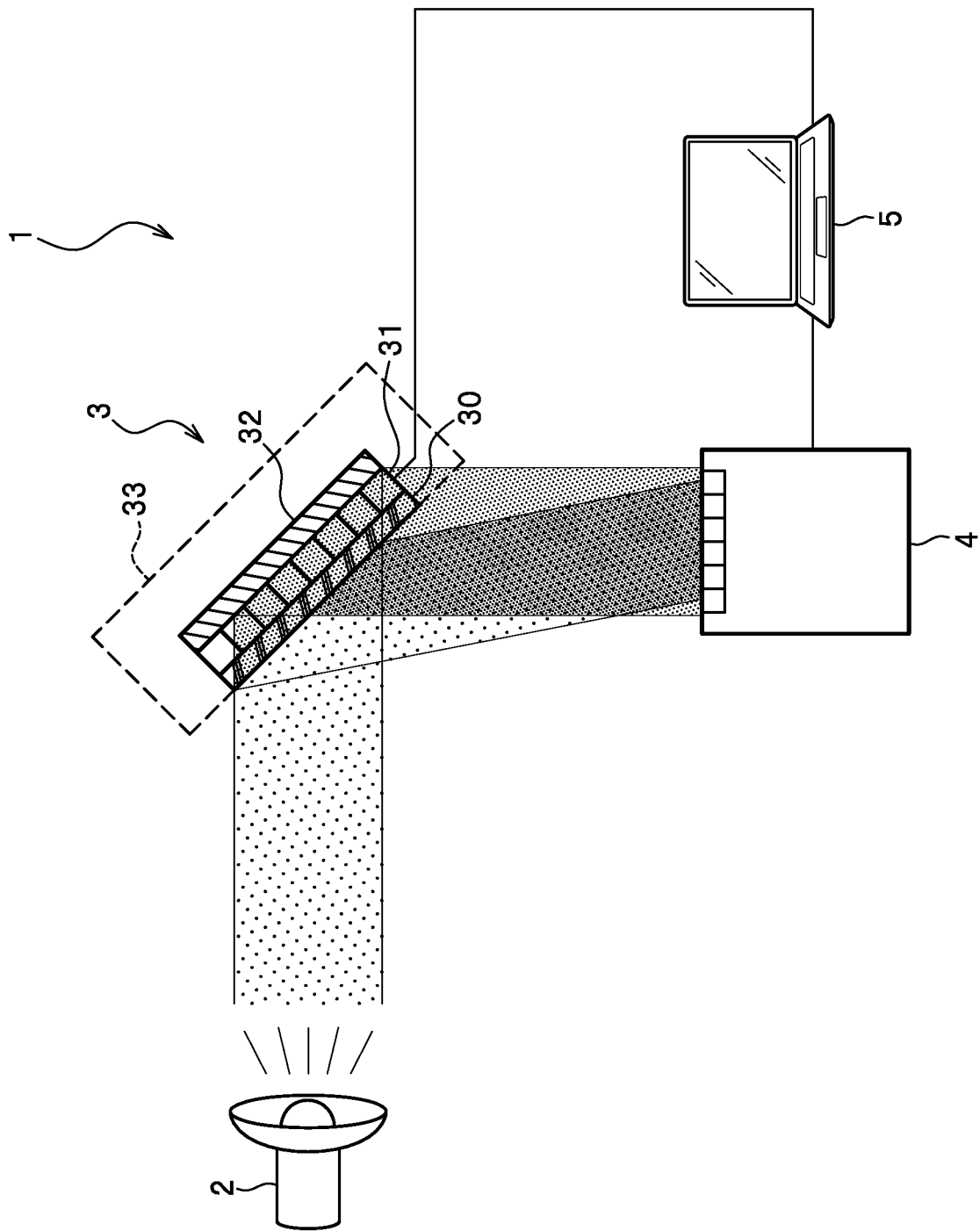
FIG. 25 is a schematic block diagram of an interference imaging device in accordance with an eighteenth modification.

With reference to FIG. 25, an eighteenth modification that uses the interference imaging device 1 as a spectral image sensing system will be described. The light source 2 emits light of multiple wavelengths. The light interference generator 3 changes the direction of propagation of light waves and phase modulates the phase of a part of the incident light using a different phase modulation amount for each wavelength. The calculation unit 5 outputs phase modulation patterns that are different for each wavelength in a time direction to the light interference generator 3. The image sensor 4 detects interference light generated by the light interference generator 3 and obtains a wavelength-multiplexed image set (interference fringe images). Furthermore, the calculation unit 5 separates the wavelength-multiplexed image set into each wavelength using a computational coherent superposition with wavelength dependency or a Fourier spectroscopy algorithm. Because the interference imaging device 1 does not include a mechanical drive part, it is robust to vibrations and has high reliability.

Nineteenth Modification: Lensless 3D Image Sensing System

Figure 26:
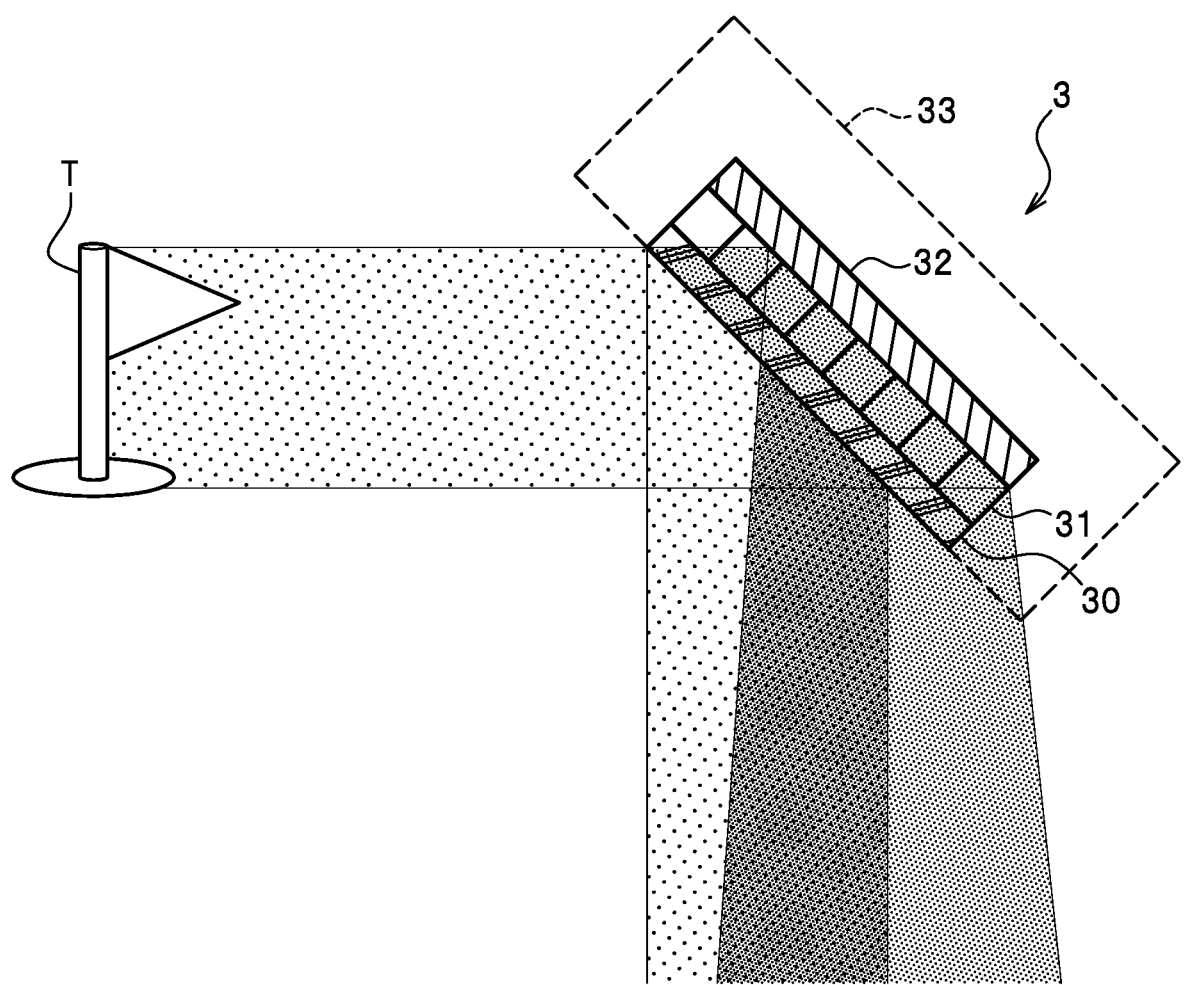
FIG. 26 is a schematic block diagram of a light interference generator in accordance with a nineteenth modification.

With reference to FIG. 26, a nineteenth modification that uses the interference imaging device 1 as a lensless three-dimensional (3D) image sensing system will be described.

As shown in FIG. 26, the light interference generator 3 phase modulates the phase of a part of light that has been generated or diffracted by an object T and generates interference light. Then, an image sensor 4 detects the interference light generated by the light interference generator 3, and the calculation unit 5 constructs a three-dimensional image of the object T (a complex amplitude image). Because the interference imaging device 1 can omit the use of a lens, a lensless 3D image sensing system of simple configuration can be achieved.

In one or more embodiments, the interference imaging device 1 generates light waves that have different radii of curvature of a wave front in the same way as a modification described earlier.

Twentieth Modification: Quantitative Phase Image Sensing System Using Shearing Interferometry With reference to FIG. 27, a twentieth modification that uses the interference imaging device 1 as a quantitative phase image sensing system using shearing interferometry will be described.

Figure 27:
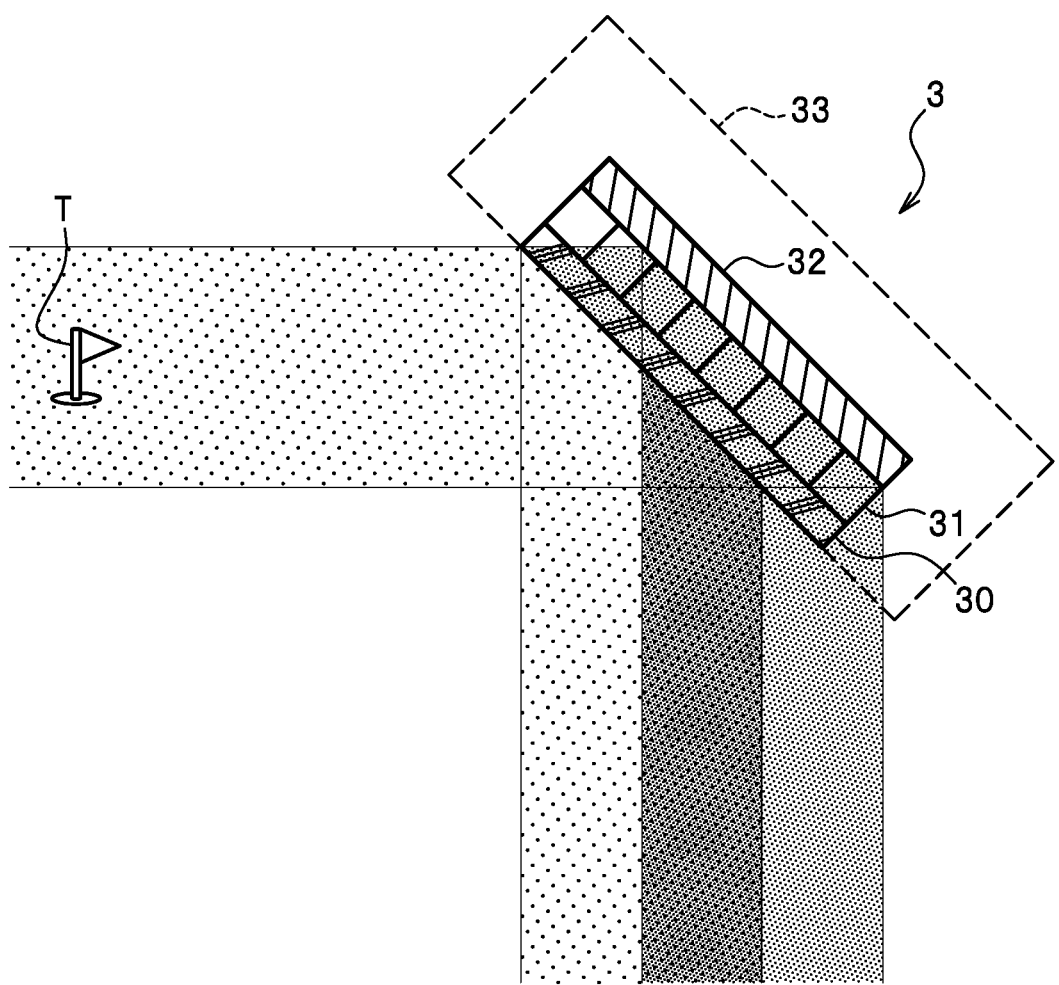
FIG. 27 is a schematic block diagram of a light interference generator in accordance with a twentieth modification.

The light source 2 emits coherent light towards an object T. As shown in FIG. 27, the light interference generator 3 phase modulates the phase of a part of light from the light source 2 and generates interference light. Then, an image sensor 4 detects the interference light generated by the light interference generator 3 and the calculation unit 5 generates a quantitative phase image of the object T. In this way, by using a single beam of light and generating interference light from light that passes through the object T and light that does not pass through the object T, the interference imaging device 1 can generate a quantitative phase image of the object T.

Twenty-first Modification: Quantitative Phase Image Sensing System Using Polarization With reference to FIGS. 28A and 28B, a twenty-first modification that uses the interference imaging device 1 as a quantitative phase image sensing system that uses polarization will be described.

Figure 28A:
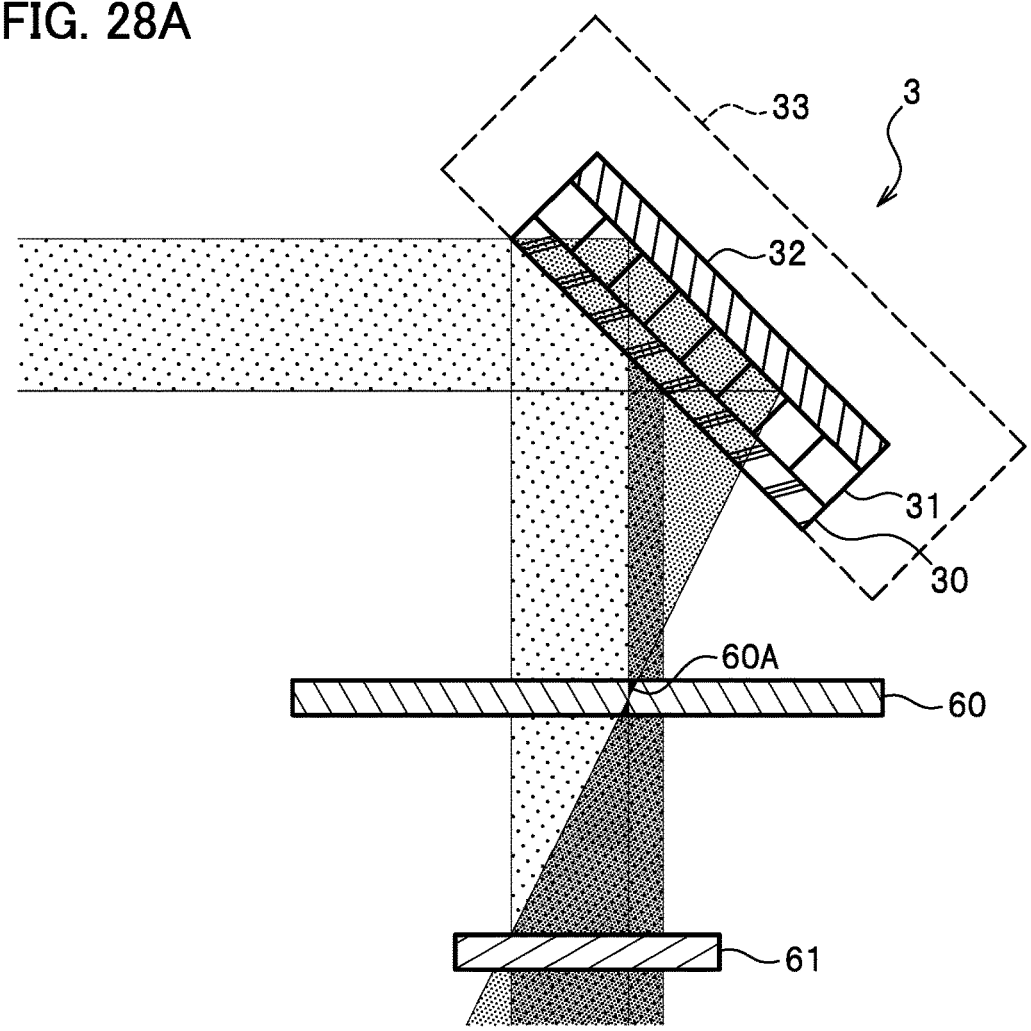
FIG. 28A is a schematic block diagram of an interference imaging device in accordance with a twenty-first modification.

As shown in FIG. 28A, the interference imaging device 1 includes a first polarizer 60 and a second polarizer 61 between the light interference generator 3 and an image sensor 4 (not shown). The light wave splitter 30 is a light wave splitter and polarizer.

Incident light emitted from a light source 2 is split into two light waves of different polarization directions by the light wave splitter 30. A light wave of a first polarization direction is reflected towards the first polarizer 60 reflector 32, and a light wave of a second polarization direction is transmitted to the phase modulator 31. The phase of the light wave of the second polarization direction is phase modulated by the phase modulator 31 and the light wave is reflected towards the first polarizer 60 by the reflector 32.

Figure 28B:
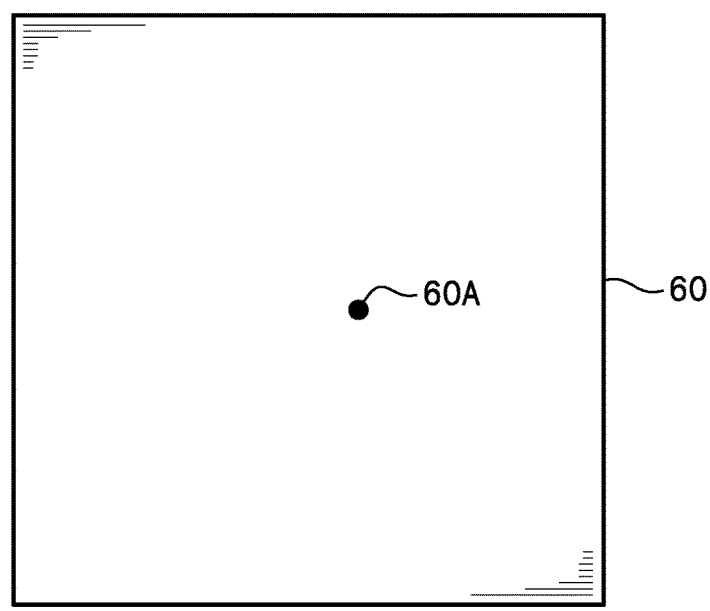
FIG. 28B is a plan view of a first polarizer.

As shown in FIG. 28B, the first polarizer 60 includes regions that allow different polarization components to pass through. The phase of the light wave of the second polarization direction that has been phase modulated by the phase modulator 31 passes through a region 60A of the first polarizer 60. This region 60A is an opening or a pinhole shaped region that the first polarizer 60 is configured to include. The light wave of the first polarization direction component that has been reflected by the light wave splitter 30 towards the reflector 32 on the other hand passes through a region other than the region 60A of the first polarizer 60 as well. Therefore, the first polarizer 60 may be configured to only allow light of the second polarization direction to pass through the region 60A and to only allow light of the first polarization direction component to pass through the region other than the region 60A.

The second polarizer 61 aligns the polarization directions of light waves that have passed through the first polarizer 60. Then, the image sensor 4 detects interference light that has been generated by the light interference generator 3 and the calculation unit 5 generates a quantitative phase image of the object T. In this way, the interference imaging device 1 splits a single light beam through polarization and generates interference light from light that passes through the object T and light that does not pass through the object T, and thus can generate a quantitative phase image of the object T.

Note that examples of use as a quantitative phase image sensing system are not limited to the modifications described above.

For example, one split light of the incident light may be turned into a spherical wave by the phase modulator and space filtering using an opening may be performed to generate a quantitative phase image.

For example, one split light of the incident light may be turned into a spherical wave by a mirror having a reflectance distribution to generate a quantitative phase image.

Furthermore, in the modifications described above, examples of reflector type quantitative phase image sensing systems have been given. However, the modifications are applicable to a transmission type as well.

Furthermore, although the modifications are described as examples of use of the interference imaging device 1 according to the first embodiment, the second and third embodiments can also be used in the same way.

Advantageous Effects

The object of the disclosure is to provide a light interference generator and an interference imaging device that are simple in configuration.

According to the disclosure, a light interference generator and an interference imaging device that are simple in configuration can be achieved.

A light interference generator according to a first aspect of the disclosure is configured in the following way. A light interference generator of a common-path type that generates interference light, which is light obtained from interfering light waves, from incident light. The light interference generator includes: a light wave splitter configured to reflect a part of the incident light and allow a remaining part of the incident light to pass through the light wave splitter; a phase modulator configured to modulate the phase of incident light that has passed through the light wave splitter; and a reflector configured to reflect the phase-modulated incident light from the phase modulator so that the reflected, phase-modulated incident light overlaps with incident light that has been reflected by the light wave splitter.

Unlike a two-beam interferometer, said light interference generator does not need separate optical paths to be formed for object light and reference light. Therefore, configuration can be simplified.

According to a second aspect of the disclosure, the reflector of the light interference generator includes parallel flat plates or is wedge shaped, convex shaped, or concave shaped.

By using a reflector that is wedge shaped, the light interference generator can increase an area in which light wave interference occurs, enable differential interference, and generate interference light easily.

By using a reflector that is convex shaped or concave shaped, the light interference generator can generate intensity distribution of interference light that is concentric.

An interference imaging device according to a third aspect of the disclosure is configured in the following way. An interference imaging device includes: the above-mentioned light interference generator; an interference light detector configured to detect the interference light generated by the light interference generator; and a calculation unit configured to make, with a predetermined phase modulation pattern, the phase modulator perform phase modulation that is dependent on a wavelength and to generate a complex amplitude image from the detected interference light with computational coherent superposition or a Fourier spectroscopy algorithm.

Unlike a two-beam interferometer, said interference imaging device does not need separate optical paths to be formed for object light and reference light. Therefore, configuration can be simplified.

An interference imaging device according to a fourth aspect of the disclosure is configured in the following way. An interference imaging device includes: a light interference generator that is a common-path type and is configured to generate interference light, which is light obtained from interfering light waves, from incident light; an interference light detector configured to detect the interference light generated by the light interference generator; and a calculation unit configured to generate a complex amplitude image from the detected interference light. The light interference generator includes: a light wave splitter configured to split the incident light into two light waves; a phase modulator configured to allow to pass therethrough or modulate the phase of first split light of the incident light that has been split by the light wave splitter and to allow to pass therethrough or modulate the phase of second split light of the incident light that has been split by the light wave splitter; and a light wave coupler configured to combine the first split light and the second split light that are transmitted from the phase modulator to form the interference light. The calculation unit is configured to make, with a predetermined phase modulation pattern, the phase modulator perform phase modulation that is dependent on a wavelength and to generate the complex amplitude image from the interference light with computational coherent superposition or a Fourier spectroscopy algorithm.

Unlike a two-beam interferometer, said interference imaging device does not need separate optical paths to be formed for object light and reference light. Therefore, configuration can be simplified.

According to a fifth aspect of the disclosure, the interference imaging device is further configured in the following way. The light wave splitter is configured from a light wave splitter and polarizer that splits the incident light into two light waves of different polarization directions. The phase modulator is configured from a polarization-sensitive phase modulator that modulates incident light of a predetermined polarization direction separated by the light wave splitter and allows incident light of another polarization direction separated by the light wave splitter to pass through the polarization-sensitive phase modulator. The light wave coupler is configured from a light wave coupler and polarizer that combines the incident light of a predetermined polarization direction and the incident light of another polarization direction that are transmitted from the phase modulator. The interference imaging device further includes a polarizer configured to align polarization directions of the incident light of a predetermined polarization direction and the incident light of another polarization direction that have been combined by the light wave coupler and polarizer.

Said interference imaging device can generate an interference fringe image using a polarization property.

The interference imaging device according to a sixth aspect of the disclosure is configured in the following way. An interference imaging device includes: a light interference generator that is a common-path type and is configured to generate interference light, which is light obtained from interfering light waves, from incident light; an interference light detector configured to detect the interference light generated by the light interference generator; and a calculation unit configured to generate a complex amplitude image from the detected interference light. The light interference generator includes: a light wave splitter configured to split the incident light into two light waves; and a phase modulator configured to modulate the phase of first split light of the incident light that has been split by the light wave splitter, overlap the first split light with second split light of the incident light that has been split by the light wave splitter to form the interference light, and output the interference light. The calculation unit is configured to make, with a predetermined phase modulation pattern, the phase modulator perform phase modulation that is dependent on a wavelength and to generate the complex amplitude image from the interference light with computational coherent superposition or a Fourier spectroscopy algorithm.

Unlike a two-beam interferometer, said interference imaging device does not need separate optical paths to be formed for object light and reference light. Therefore, configuration can be simplified.

According to a seventh aspect of the disclosure, an interference imaging device may further be configured so that the phase modulator is shaped with varying thickness or is configured to include varying gradients of phase modulation.

This light interference generator can increase an area in which light wave interference occurs, enable differential interference, and generate interference light easily.

According to an eighth aspect of the disclosure, an interference imaging device may further be configured so that the light wave splitter is wedge shaped, convex shaped, or concave shaped.

By using a reflector that is wedge shaped, this interference imaging device can increase an area in which light wave interference occurs, enable differential interference, and generate interference light easily.

By using a reflector that is convex shaped or concave shaped, this interference imaging device can generate intensity distribution of interference light that is concentric.

REFERENCE SIGNS LIST 1 interference imaging device
2 light source
3, 3B-3I light interference generator
4 image sensor (interference light detector)
5 calculation unit
30, 30C, 30G, 30H, 30I light wave splitter
31, 31D phase modulator
32, 32B, 32E, 32F reflector
33 housing
60 first polarizer
60A region
61 second polarizer
100 interference imaging device
300, 300B-300K light interference generator
310, 310E-300G light wave splitter
310K light wave splitter and coupler
320, 320B, 320D phase modulator
330, 330H-330J light wave coupler
340 housing
350 light wave splitter and polarizer
360 polarization-sensitive phase modulator
370 light wave coupler and polarizer
380 polarizer

The invention claimed is:

1. A light interference generator of a common-path light interference generator that generates interference light from incident light, the light interference generator comprising:
 a light wave splitter configured to reflect a part of the incident light and allow a remaining part of the incident light to pass through the light wave splitter;
 a phase modulator configured to modulate a phase of incident light that has passed through the light wave splitter; and
 a reflector configured to reflect the phase-modulated incident light from the phase modulator so that the reflected, phase-modulated incident light overlaps with incident light that has been reflected by the light wave splitter.

2. The light interference generator according to claim 1, wherein
 the reflector includes parallel flat plates or is wedge shaped, convex shaped, or concave shaped.

3. An interference imaging device comprising:
 a light interference generator according to claim 2;
 an interference light detector configured to detect the interference light generated by the light interference generator; and
 a calculation unit configured to make, with a predetermined phase modulation pattern, the phase modulator perform phase modulation that is dependent on a wavelength and to generate a complex amplitude image from the detected interference light with a computational coherent superposition or a Fourier spectroscopy algorithm.

4. The interference imaging device according to claim 3, wherein
the phase modulator is shaped with varying thickness or is configured to include varying gradients of phase modulation.

5. The interference imaging device according to claim 3, wherein
the light wave splitter is wedge shaped, convex shaped, or concave shaped.

6. An interference imaging device comprising:
a light interference generator according to claim 1;
an interference light detector configured to detect the interference light generated by the light interference generator; and
a calculation unit configured to make, with a predetermined phase modulation pattern, the phase modulator perform phase modulation that is dependent on a wavelength and to generate a complex amplitude image from the detected interference light with a computational coherent superposition or a Fourier spectroscopy algorithm.

7. The interference imaging device according to claim 6, wherein
the phase modulator is shaped with varying thickness or is configured to include varying gradients of phase modulation.

8. The interference imaging device according to claim 6, wherein
the light wave splitter is wedge shaped, convex shaped, or concave shaped.

9. An interference imaging device comprising:
a light interference generator that is a common-path light interference generator and is configured to generate interference light from incident light;
an interference light detector configured to detect the interference light generated by the light interference generator; and
a calculation unit configured to generate a complex amplitude image from the detected interference light,
wherein the light interference generator includes:
a light wave splitter configured to split the incident light into two light waves;
a phase modulator configured to allow to pass therethrough or modulate a phase of first split light of the incident light that has been split by the light wave splitter and to allow to pass therethrough or modulate a phase of second split light of the incident light that has been split by the light wave splitter; and
a light wave coupler configured to combine the first split light and the second split light that are transmitted from the phase modulator to form the interference light, and
wherein the calculation unit is configured to make, with a predetermined phase modulation pattern, the phase modulator perform phase modulation that is wavelength dependent and to generate the complex amplitude image from the interference light with a computational coherent superposition or a Fourier spectroscopy algorithm.

10. The interference imaging device according to claim 9, wherein the light wave splitter is configured from a light wave splitter and polarizer that splits the incident light into two light waves of different polarization directions, wherein the phase modulator is configured from a polarization-sensitive phase modulator that modulates a phase of incident light of a predetermined polarization direction separated by the light wave splitter and polarizer and allows incident light of another polarization direction separated by the light wave splitter to pass through the polarization-sensitive phase modulator,
wherein the light wave coupler is configured from a light wave coupler and polarizer that combines the incident light of a predetermined polarization direction and the incident light of another polarization direction that are transmitted from the polarization-sensitive phase modulator, and
wherein the interference imaging device further includes a polarizer configured to align polarization directions of the incident light of a predetermined polarization direction and the incident light of another polarization direction that have been combined by the light wave coupler and polarizer.

11. The interference imaging device according to claim 10, wherein
the phase modulator is shaped with varying thickness or is configured to include varying gradients of phase modulation.

12. The interference imaging device according to claim 10, wherein
the light wave splitter is wedge shaped, convex shaped, or concave shaped.

13. The interference imaging device according to claim 9, wherein
the phase modulator is shaped with varying thickness or is configured to include varying gradients of phase modulation.

14. The interference imaging device according to claim 9, wherein
the light wave splitter is wedge shaped, convex shaped, or concave shaped.

15. An interference imaging device comprising:
a light interference generator that is a common-path light interference generator and is configured to generate interference light from incident light;
an interference light detector configured to detect the interference light generated by the light interference generator; and
a calculation unit configured to generate a complex amplitude image from the detected interference light,
wherein the light interference generator includes:
a light wave splitter configured to split the incident light into two light waves; and
a phase modulator configured to modulate a phase of first split light of the incident light that has been split by the light wave splitter, overlap the first split light with second split light of the incident light that has been split by the light wave splitter to form the interference light, and output the interference light, and
wherein the calculation unit is configured to make, with a predetermined phase modulation pattern, the phase modulator perform phase modulation that is wavelength dependent and to generate the complex amplitude image from the interference light with a computational coherent superposition or a Fourier spectroscopy algorithm.

16. The interference imaging device according to claim 15, wherein the phase modulator is shaped with varying thickness or is configured to include varying gradients of phase modulation.

17. The interference imaging device according to claim 15, wherein
the light wave splitter is wedge shaped, convex shaped, or concave shaped.

* * * * *